US008481666B2

(12) United States Patent
Michie et al.

(10) Patent No.: US 8,481,666 B2
(45) Date of Patent: *Jul. 9, 2013

(54) POLYETHYLENE COMPOSITIONS, METHOD OF PRODUCING THE SAME, ARTICLES MADE THEREFROM, AND METHOD OF MAKING THE SAME

(75) Inventors: William Michie, Missouri City, TX (US); Mark Davis, Lake Jackson, TX (US); Nathan Wiker, Chicago, IL (US); Debra Wilson, Missouri City, TX (US); Peter Schindler, Mannedorf (CH); John Garnett, Waedenswil (CH)

(73) Assignee: Dow Global Technologies LLC., Midland, MI (US)

( * ) Notice: Subject to any disclaimer, the term of this patent is extended or adjusted under 35 U.S.C. 154(b) by 26 days.

This patent is subject to a terminal disclaimer.

(21) Appl. No.: 12/663,871

(22) PCT Filed: Jan. 23, 2009

(86) PCT No.: PCT/US2009/031808
§ 371 (c)(1), (2), (4) Date: May 28, 2010

(87) PCT Pub. No.: WO2009/097222
PCT Pub. Date: Aug. 6, 2009

(65) Prior Publication Data
US 2010/0298508 A1    Nov. 25, 2010

Related U.S. Application Data

(60) Provisional application No. 61/024,237, filed on Jan. 29, 2008.

(51) Int. Cl.
C08F 10/02    (2006.01)
C08F 4/6592   (2006.01)

(52) U.S. Cl.
USPC ........... 526/352; 526/160; 526/170; 526/348; 526/348.2; 526/348.6

(58) Field of Classification Search
USPC ............ 526/160, 348, 348.2, 352, 170, 348.6
See application file for complete search history.

(56) References Cited

U.S. PATENT DOCUMENTS

| 4,543,399 A | 9/1985 | Jenkins, III et al. |
| 4,621,952 A | 11/1986 | Aronson |
| 4,798,081 A | 1/1989 | Hazlitt et al. |
| 4,933,149 A | 6/1990 | Rhee et al. |
| 5,089,321 A | 2/1992 | Chum et al. |
| 5,292,845 A | 3/1994 | Kawasaki et al. |
| 5,405,922 A | 4/1995 | DeChellis et al. |
| 5,462,999 A | 10/1995 | Griffin et al. |
| 6,153,716 A | 11/2000 | Welch et al. |
| 6,242,545 B1 | 6/2001 | Jejelowo et al. |
| 6,485,662 B1 | 11/2002 | Neubauer et al. |
| 6,627,713 B2 | 9/2003 | Bernier et al. |
| 7,078,467 B1 * | 7/2006 | Kolb et al. ............ 526/88 |
| 2007/0276110 A1 | 11/2007 | Michie et al. |

FOREIGN PATENT DOCUMENTS

| EP | 0 877 051 A1 | 11/1998 |
| WO | WO-99/14271 A1 | 3/1999 |
| WO | WO-00/68285 A1 | 11/2000 |

OTHER PUBLICATIONS

International Search Report (PCT/US2009/031808), 2009.
Williams, T., et al., The Construction of a Polyethylene Calibration Curve for gel Permeation Chromatography using Polystyrene Fractions, Journal of Polymer Science: Polymer Letters, 1968, pp. 621-624, vol. 6.
Mourey, Thomas H. et al., A Strategy for Interpreting Multidetector Size-Exclustion Chromatography Data I, Chromatography of Polymers, 1992, pp. 180-198, Chapter 12.
Balke, Stephen T., et al., A Strategy for Interpreting Multidetector Size-Exclusion Chromatography Data II, Chromatography of Polymers, 1992, pp. 199-219, Chapter 13.
Zimm, Bruno H., Apparatus and Methods for Measurement and Interpretation of the Angular Variation of Light Scattering; Preliminary Results on Polystyrene Solutions, The Journal of Chemical Physics, 1948, pp. 1099-1116, vol. 16, No. 12, Department of Chemistry, California.
Kratochvil, P., Fundamental Light-Scattering Methods, Classical Light Scattering from Polymer Solutions, 1987, pp. 113-144, Chapter 3, Elsevier, New York.
Wild, L, et al., Determination of Branching Distributions in Polyethylene and Ethylene Copolymers, Journal of Polymer Science: Polymer Physics Edidtion, 1982, pp. 441-455, vol. 20, John Wiley & Sons, Inc.
Randall, James C., A Review of High Resolution Liquid $^{13}$Carbon Nuclear Magnetic Resonance Characterizations of Ehtylene-Based Polymers, JMS-Rev. Macromol. Chem. Phys.. 1989, pp. 201-317, C29(2 & 3), Baytown Polymers Center, Texas.

* cited by examiner

Primary Examiner — Roberto Rabago

(57) ABSTRACT

The instant invention is a polyethylene composition, method of producing the same, articles made therefrom, and method of making the same. The polyethylene composition according to the instant invention comprises (1) less than or equal to 100 percent by weight of the units derived from ethylene; and (2) less than 15 percent by weight of units derived from one or more α-olefin comonomers. The polyethylene composition according the instant invention has a density of equal to D g/cm$^3$, wherein D=[(0.0034(Ln($I_2$))+0.9553], wherein $I_2$ is melt index expressed in g/10 min, a molecular weight distribution ($M_w/M_n$) in the range of 1.70 to 3.62, a melt index ($I_2$) in the range of 2 to 1000 g/10 minutes, a molecular weight distribution ($M_z/M_w$) in the range of less than 2.5, and a vinyl unsaturation of less than 0.06 vinyls per one thousand carbon atoms present in the backbone of the composition.

17 Claims, 10 Drawing Sheets

POLYETHYLENE COMPOSITIONS, METHOD OF PRODUCING THE SAME, ARTICLES MADE THEREFROM, AND METHOD OF MAKING THE SAME

CROSS-REFERENCE TO RELATED APPLICATIONS

This application is a non-provisional application claiming priority from the U.S. Provisional Patent Application No. 61/024,237, filed on Jan. 29, 2008, entitled "POLYETHYLENE COMPOSITIONS, METHOD OF PRODUCING THE SAME, ARTICLES MADE THEREFROM, AND METHOD MAKING THE SAME," the teachings of which are incorporated by reference herein, as if reproduced in full hereinbelow.

FIELD OF INVENTION

The instant invention relates to polyethylene compositions, method of producing the same, articles made therefrom, and method of making the same.

BACKGROUND OF THE INVENTION

The use of polyethylene compositions, such as linear low density polyethylenes and/or high density polyethylenes, in fabrication of injection molded articles is generally known. Any conventional method, such as gas phase process, slurry process, solution process or high pressure process, may be employed to produce such polyethylene compositions.

In general, in the injection molding process, a polyethylene composition is fed into an extruder via a hopper. The extruder conveys, heats, melts, and pressurizes the polyethylene composition to a form a molten stream. The molten stream is forced out of the extruder under pressure through a nozzle into a relatively cool mold held closed thereby filling the mold under pressure. The melt cools and hardens until fully set-up. The mold then is opened and the molded article, e.g. tote, dish pan, waist container, bottle cap, is removed.

Various polymerization techniques using different catalyst systems have been employed to produce such polyethylene compositions suitable for injection molding applications. However, the currently available polyethylene compositions fail to provide a stiffness/toughness balance that is required for injection moldings applications, e.g. thin wall articles with improved cold temperature performance.

Despite the research efforts in developing polyethylene compositions suitable for injection molding, there is still a need for a polyethylene composition having a narrow molecular weight distribution, narrow composition distribution, and improved low and room temperature impact resistance while maintaining stiffness and processability properties. Additionally, there is a need for a method of producing such polyethylene compositions having a narrow molecular weight distribution, narrow composition distribution, and improved low temperature impact resistance while maintaining stiffness and processability properties.

SUMMARY OF THE INVENTION

The instant invention is a polyethylene composition, method of producing the same, articles made therefrom, and method of making the same. The polyethylene composition according to the instant invention comprises (1) less than or equal to 100 percent by weight of the units derived from ethylene; and (2) less than 15 percent by weight of units derived from one or more α-olefin comonomers. The polyethylene composition according the instant invention has a density in the range of 0.907 to 0.975 g/cm$^3$, a molecular weight distribution ($M_w/M_n$) in the range of 1.70 to 3.62, a melt index ($I_2$) in the range of 2 to 1000 g/10 minutes, a molecular weight distribution ($M_z/M_w$) in the range of less than 2.5, and a vinyl unsaturation of less than 0.06 vinyls per one thousand carbon atoms present in the backbone of the composition. The process for producing a polyethylene composition according to the instant invention comprises the steps of: (1) (co)polymerizing ethylene and optionally one or more α-olefin comonomers in the presence of a hafnium based metallocene catalyst via a gas phase (co)polymerization process in a single stage reactor; and (2) thereby producing the inventive polyethylene composition, wherein the polyethylene composition has a density in the range of 0.907 to 0.975 g/cm$^3$, a molecular weight distribution ($M_w/M_n$) in the range of 1.70 to 3.62, a melt index ($I_2$) in the range of 2 to 1000 g/10 minutes, a molecular weight distribution ($M_z/M_w$) in the range of less than 2.5, and a vinyl unsaturation of less than 0.06 vinyls per one thousand carbon atoms present in the backbone of said composition. The injection molded articles according to the instant invention comprise a polyethylene composition comprising (1) less than or equal to 100 percent by weight of the units derived from ethylene; and (2) less than 15 percent by weight of units derived from one or more α-olefin comonomers; wherein the polyethylene composition has a density in the range of 0.907 to 0.975 g/cm$^3$, a molecular weight distribution ($M_w/M_n$) in the range of 1.70 to 3.62, a melt index ($I_2$) in the range of 2 to 1000 g/10 minutes, a molecular weight distribution ($M_z/M_w$) in the range of less than 2.5, vinyl unsaturation of less than 0.06 vinyls per one thousand carbon atoms present in the backbone of said composition. The process for making an injection molded article according to the instant invention comprises the steps of: (a) selecting a polyethylene composition comprising (1) less than or equal to 100 percent by weight of the units derived from ethylene; and (2) less than 15 percent by weight of units derived from one or more α-olefin comonomers; wherein the polyethylene composition has a density in the range of 0.907 to 0.975 g/cm$^3$, a molecular weight distribution ($M_w/M_n$) in the range of 1.70 to 3.62, a melt index ($I_2$) in the range of 2 to 1000 g/10 minutes, a molecular weight distribution ($M_z/M_w$) in the range of less than 2.5, vinyl unsaturation of less than 0.06 vinyls per one thousand carbon atoms present in the backbone of said composition; (b) injection molding said polyethylene composition; and (c) thereby forming the injection molded article.

In one embodiment, the instant invention provides a polyethylene composition comprising (1) less than or equal to 100 percent by weight of the units derived from ethylene; and (2) less than 15 percent by weight of units derived from one or more α-olefin comonomers, wherein the polyethylene composition has a density in the range of 0.907 to 0.975 g/cm$^3$, a molecular weight distribution ($M_w/M_n$) in the range of 1.70 to 3.62, a melt index ($I_2$) in the range of 2 to 1000 g/10 minutes, a molecular weight distribution ($M_z/M_w$) in the range of less than 2.5, and a vinyl unsaturation of less than 0.06 vinyls per one thousand carbon atoms present in the backbone of the composition.

In an alternative embodiment, the instant invention further provides a polyethylene composition comprising the (co)polymerization reaction product of ethylene and optionally one or more α-olefin comonomers in the presence of a hafnium based metallocene catalyst via a gas phase (co)polymerization process in a single stage reactor; wherein the polyethylene composition has a density in the range of 0.907 to 0.975 g/cm³, a molecular weight distribution ($M_w/M_n$) in the range of 1.70 to 3.62, a melt index ($I_2$) in the range of 2 to 1000 g/10 minutes, a molecular weight distribution ($M_z/M_w$) in the range of less than 2.5, and a vinyl unsaturation of less than 0.06 vinyls per one thousand carbon atoms present in the backbone of the composition.

In another alternative embodiment, the instant invention further provides a process for producing a polyethylene composition comprising the steps of: (1) (co)polymerizing ethylene and optionally one or more α-olefin comonomers in the presence of a hafnium based metallocene catalyst via a gas phase (co)polymerization process in a single stage reactor; and (2) thereby producing the inventive polyethylene composition, wherein polyethylene composition according the instant invention has a density in the range of 0.907 to 0.975 g/cm³, a molecular weight distribution ($M_w/M_n$) in the range of 1.70 to 3.62, a melt index ($I_2$) in the range of 2 to 1000 g/10 minutes, a molecular weight distribution ($M_z/M_w$) in the range of less than 2.5, and a vinyl unsaturation of less than 0.06 vinyls per one thousand carbon atoms present in the backbone of said composition.

In another alternative embodiment, the instant invention further provides an injection molded article comprising a polyethylene composition comprising (1) less than or equal to 100 percent by weight of the units derived from ethylene; and (2) less than 15 percent by weight of units derived from one or more α-olefin comonomers; wherein said polyethylene composition has a density in the range of 0.907 to 0.975 g/cm³, a molecular weight distribution ($M_w/M_n$) in the range of 1.70 to 3.62, a melt index ($I_2$) in the range of 2 to 1000 g/10 minutes, a molecular weight distribution ($M_z/M_w$) in the range of less than 2.5, vinyl unsaturation of less than 0.06 vinyls per one thousand carbon atoms present in the backbone of said composition.

In another alternative embodiment, the instant invention further provides a process for making an article comprising the steps of: (a) selecting a polyethylene composition comprising (1) less than or equal to 100 percent by weight of the units derived from ethylene; and (2) less than 15 percent by weight of units derived from one or more α-olefin comonomers; wherein said polyethylene composition has a density in the range of 0.907 to 0.975 g/cm³, a molecular weight distribution ($M_w/M_n$) in the range of 1.70 to 3.62, a melt index ($I_2$) in the range of 2 to 1000 g/10 minutes, a molecular weight distribution ($M_z/M_w$) in the range of less than 2.5, vinyl unsaturation of less than 0.06 vinyls per one thousand carbon atoms present in the backbone of said composition; (b) injection molding said polyethylene composition; and (c) thereby forming said injection molded article.

In another alternative embodiment, the instant invention provides a polyethylene composition, method of producing the same, articles made therefrom, and method of making such articles, in accordance with any of the preceding embodiments, except that the polyethylene composition has a density in the range of 0.911 to 0.972 g/cm³.

In another alternative embodiment, the instant invention provides a composition, method of producing the same, articles made therefrom, and method of making such articles, in accordance with any of the preceding embodiments, except that the polyethylene composition has a vinyl unsaturation of less than 0.05 vinyls per one thousand carbon atoms present in the backbone of the composition.

In another alternative embodiment, the instant invention provides a polyethylene composition, method of producing the same, articles made therefrom, and method of making such articles, in accordance with any of the preceding embodiments, except that the polyethylene composition has a molecular weight distribution ($M_w/M_n$) of less than $[(-16.18)(D)]+18.83$, wherein D is the density of the polyethylene composition in the range of greater than 0.940 g/cm³ to less than or equal to 0.975 g/cm³.

In another alternative embodiment, the instant invention provides a polyethylene composition, method of producing the same, articles made therefrom, and method of making such articles, in accordance with any of the preceding embodiments, except that the polyethylene composition has a density in the range of 0.924 to 0.930 g/cm³, and a melt index ($I_2$) in the range of 40 to 80 g/10 minutes.

In another alternative embodiment, the instant invention provides a polyethylene composition, method of producing the same, articles made therefrom, and method of making such articles, in accordance with any of the preceding embodiments, except that the polyethylene composition has a density in the range of 0.926 to 0.936 g/cm³, and a melt index ($I_2$) in the range of 80 to 250 g/10 minutes.

In another alternative embodiment, the instant invention provides a polyethylene composition, method of producing the same, articles made therefrom, and method of making such articles, in accordance with any of the preceding embodiments, except that the polyethylene composition has a density in the range of 0.940 to 0.946 g/cm³, and a melt index ($I_2$) in the range of 100 to 300 g/10 minutes.

In another alternative embodiment, the instant invention provides a polyethylene composition, method of producing the same, articles made therefrom, and method of making such articles, in accordance with any of the preceding embodiments, except that the polyethylene composition has a density in the range of 0.946 to 0.953 g/cm³, and a melt index ($I_2$) in the range of 60 to 110 g/10 minutes.

In another alternative embodiment, the instant invention provides a polyethylene composition, method of producing the same, articles made therefrom, and method of making such articles, in accordance with any of the preceding embodiments, except that the polyethylene composition has a density in the range of 0.948 to 0.956 g/cm³, and a melt index ($I_2$) in the range of 30 to 90 g/10 minutes.

In another alternative embodiment, the instant invention provides a polyethylene composition, method of producing the same, articles made therefrom, and method of making such articles, in accordance with any of the preceding embodiments, except that the polyethylene composition has a density in the range of 0.946 to 0.956 g/cm³, and a melt index ($I_2$) in the range of 3 to 30 g/10 minutes.

In another alternative embodiment, the instant invention provides a polyethylene composition, method of producing the same, articles made therefrom, and method of making such articles, in accordance with any of the preceding embodiments, except that the polyethylene composition has a density of approximately equal to D, wherein $D=[(0.0034(Ln(I_2))+0.9553]$, wherein $I_2$ is melt index expressed in g/10 min.

In another alternative embodiment, the instant invention provides a polyethylene composition, method of producing the same, articles made therefrom, and method of making such articles, in accordance with any of the preceding embodiments, except that the polyethylene composition has a short chain branching distribution breadth (SCBDB) expressed in ° C. of less than or equal to $[0.025 (I_2)+4.08]$, wherein $I_2$ is melt index expressed in g/10 min, and wherein the composition has a density in the range of equal or greater than 0.930 g/cm³ to less than 0.940 g/cm³.

In another alternative embodiment, the instant invention provides a polyethylene composition, method of producing the same, articles made therefrom, and method of making such articles, in accordance with any of the preceding embodiments, except that the polyethylene composition has a short chain branching distribution breadth (SCBDB) expressed in ° C. of less than or equal to [0.0312 ($I_2$)+2.87], wherein $I_2$ is melt index expressed in g/10 min, and wherein the polyethylene composition has a density in the range of equal or greater than 0.940 g/cm$^3$.

In another alternative embodiment, the instant invention provides a polyethylene composition, method of producing the same, articles made therefrom, and method of making such articles, in accordance with any of the preceding embodiments, except that the polyethylene composition has a tensile impact expressed in ft-lb/in$^2$ of equal or greater than [(−6.53*10$^{−5}$)(x$^4$)]+[(1.3*10$^{−2}$)(x$^3$)]−[(9.68*10$^{−1}$)(x$^2$)]+[(3.22*10)(x)]−[(3.69*10$^2$)], wherein x is the shear viscosity of the composition expressed in Pascal-s at 3000 s$^{−1}$ shear rate measured at 190° C., wherein the shear viscosity is in the range of 25 to 55 Pascal-s at 3000 s$^{−1}$ shear rate measured at 190° C., and wherein the modulus of the composition is in the range of 75,000 to 115,000 psi.

In another alternative embodiment, the instant invention provides a polyethylene composition, method of producing the same, articles made therefrom, and method of making such articles, in accordance with any of the preceding embodiments, except that the polyethylene composition has less than 2 peaks on an elution temperature-eluted amount curve determined by continuous temperature rising elution fraction method at equal or above 30° C., wherein the purge peak which is below 30° C. is excluded.

In another alternative embodiment, the instant invention provides a polyethylene composition, method of producing the same, articles made therefrom, and method of making such articles, in accordance with any of the preceding embodiments, except that the polyethylene composition has only 1 peak on an elution temperature-eluted amount curve determined by continuous temperature rising elution fraction method at equal or above 30° C., wherein the purge peak which is below 30° C. is excluded.

In another alternative embodiment, the instant invention provides a polyethylene composition, method of producing the same, articles made therefrom, and method of making such articles, in accordance with any of the preceding embodiments, except that the polyethylene composition has a molecular weight distribution (Mz/Mw) in the range of less than 2.3.

In another alternative embodiment, the instant invention provides a polyethylene composition, method of producing the same, articles made therefrom, and method of making such articles, in accordance with any of the preceding embodiments, except that the polyethylene composition comprises less than 11 percent by weight of the units derived from one or more α-olefin comonomers.

In another alternative embodiment, the instant invention provides a polyethylene composition, method of producing the same, articles made therefrom, and method of making such articles, in accordance with any of the preceding embodiments, except that the polyethylene composition comprises less than 9 percent by weight of the units derived from one or more α-olefin comonomers.

In another alternative embodiment, the instant invention provides a polyethylene composition, method of producing the same, articles made therefrom, and method of making such articles, in accordance with any of the preceding embodiments, except that the polyethylene composition comprises less than 7 percent by weight of the units derived from one or more α-olefin comonomers.

In another alternative embodiment, the instant invention provides a polyethylene composition, method of producing the same, articles made therefrom, and method of making such articles, in accordance with any of the preceding embodiments, except that the polyethylene composition comprises less than 5 percent by weight of the units derived from one or more α-olefin comonomers.

In another alternative embodiment, the instant invention provides a polyethylene composition, method of producing the same, articles made therefrom, and method of making such articles, in accordance with any of the preceding embodiments, except that the polyethylene composition comprises less than 3 percent by weight of the units derived from one or more α-olefin comonomers.

In another alternative embodiment, the instant invention provides a polyethylene composition, method of producing the same, articles made therefrom, and method of making such articles, in accordance with any of the preceding embodiments, except that the polyethylene composition is substantially free of any long chain branching.

In another alternative embodiment, the instant invention provides a polyethylene composition, method of producing the same, articles made therefrom, and method of making such articles, in accordance with any of the preceding embodiments, except that the polyethylene composition is free of any long chain branching.

In another alternative embodiment, the instant invention provides a polyethylene composition, method of producing the same, articles made therefrom, and method of making such articles, in accordance with any of the preceding embodiments, except that the polyethylene composition further comprises less than 100 parts by weight of hafnium residues remaining from the hafnium based metallocene catalyst per one million parts of polyethylene composition.

In another alternative embodiment, the instant invention provides a polyethylene composition, method of producing the same, articles made therefrom, and method of making such articles, in accordance with any of the preceding embodiments, except that the polyethylene composition has a melt flow ratio ($I_{21}/I_2$) in the range of 17 to 24.

In another alternative embodiment, the instant invention provides a polyethylene composition, method of producing the same, articles made therefrom, and method of making such articles, in accordance with any of the preceding embodiments, except that the polyethylene composition has a melt flow ratio ($I_{21}/I_2$) in the range of 17 to 23.

In another alternative embodiment, the instant invention provides a polyethylene composition, method of producing the same, articles made therefrom, and method of making such articles, in accordance with any of the preceding embodiments, except that the polyethylene composition has a melt flow ratio ($I_{21}/I_2$) in the range of 21 to 24.

In another alternative embodiment, the instant invention provides a polyethylene composition, method of producing the same, articles made therefrom, and method of making such articles, in accordance with any of the preceding embodiments, except that the polyethylene composition has a melt index $I_{21}$ in the range of 34 to 24000 g/10 minutes.

BRIEF DESCRIPTION OF THE DRAWINGS

For the purpose of illustrating the invention, there is shown in the drawings a form that is exemplary; it being understood, however, that this invention is not limited to the precise arrangements and instrumentalities shown.

DETAILED DESCRIPTION OF THE INVENTION

Figure 1:
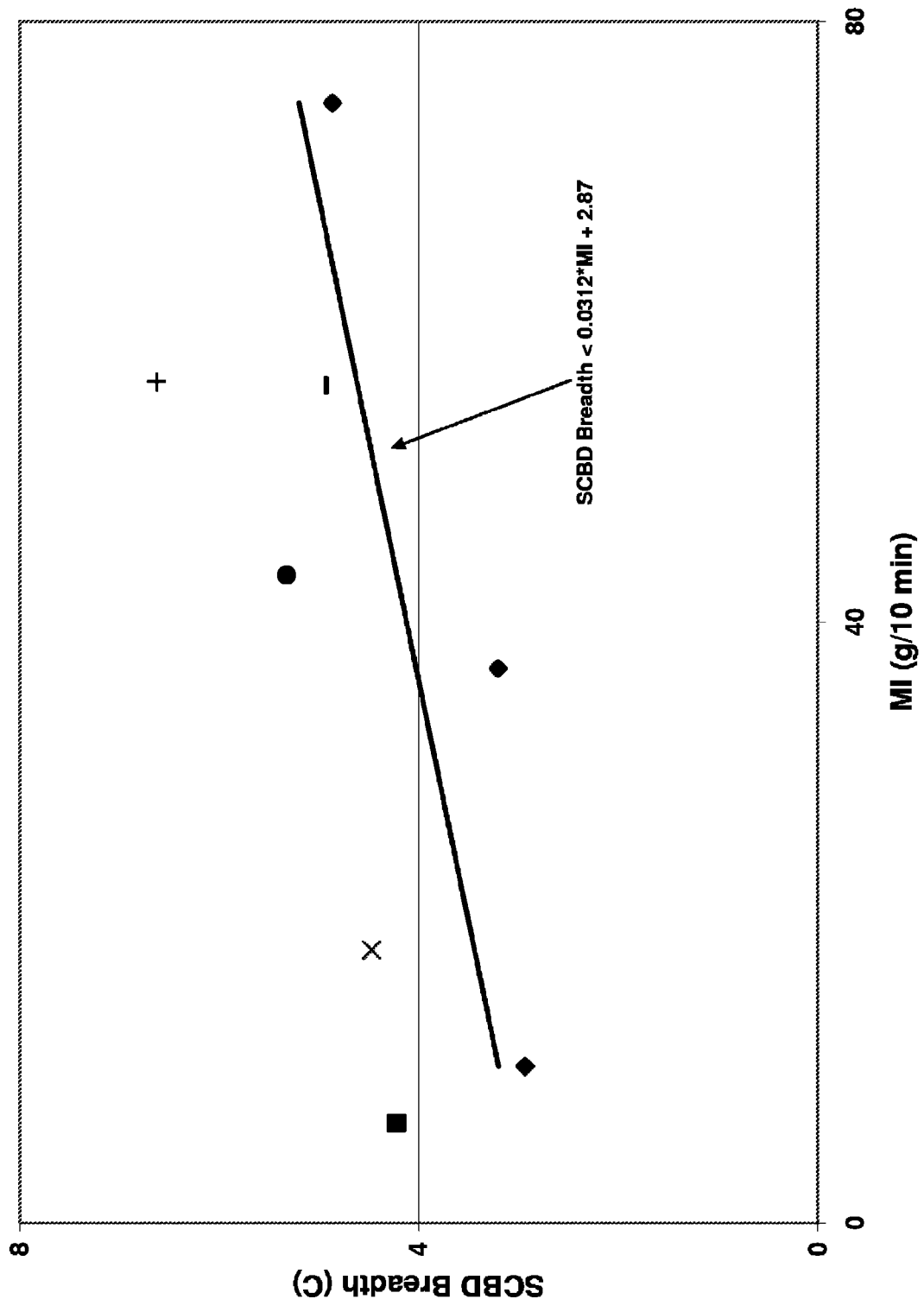
FIG. 1 illustrates the relationship between the short chain branching distribution breadth expressed in ° C. and melt index ($I_2$) expressed in g/10 minutes of the inventive samples versus the comparative samples, wherein the inventive samples have a density in the range of equal or greater than 0.940 g/cm$^3$.

The instant invention is a polyethylene composition, method of producing the same, articles made therefrom, and method of making the same.

The polyethylene composition according to instant invention possesses unique properties and differentiated performance in different applications, as described in further details hereinbelow.

The term (co)polymerization, as used herein, refers to the polymerization of ethylene and optionally one or more comonomers, e.g. one or more α-olefin comonomers. Thus, the term (co)polymerization refers to both polymerization of ethylene and copolymerization of ethylene and one or more comonomers, e.g. one or more α-olefin comonomers.

The polyethylene composition according to instant invention has a density in the range of 0.907 to 0.975 g/cm$^3$. All individual values and subranges from 0.907 to 0.975 g/cm$^3$ are included herein and disclosed herein; for example, the density can be from a lower limit of 0.907, 0.911, 0.919, 0.923, 0.928, or 0.936 g/cm$^3$ to an upper limit of 0.941, 0.947, 0.954, 0.959, 0.965, 0.972, or 0.975 g/cm$^3$. For example, the polyethylene composition may have a density in the range of 0.907 to 0.975 g/cm$^3$; or in the alternative, the polyethylene composition may have a density in the range of 0.907 to 0.972 g/cm$^3$; or in the alternative, the polyethylene composition may have a density in the range of 0.907 to 0.965 g/cm$^3$; or in the alternative, the polyethylene composition may have a density in the range of 0.907 to 0.959 g/cm$^3$; or in the alternative, the polyethylene composition may have a density in the range of 0.907 to 0.954 g/cm$^3$; or in the alternative, the polyethylene composition may have a density in the range of 0.907 to 0.947 g/cm$^3$; or in the alternative, the polyethylene composition may have a density in the range of 0.907 to 0.941 g/cm$^3$; or in the alternative, the polyethylene composition may have a density in the range of 0.911 to 0.972 g/cm$^3$; or in the alternative, the polyethylene composition may have a density in the range of 0.940 to 0.975 g/cm$^3$; or in the alternative, the polyethylene composition may have a density in the range of 0.924 to 0.930 g/cm$^3$; or in the alternative, the polyethylene composition may have a density in the range of 0.926 to 0.936 g/cm$^3$; or in the alternative, the polyethylene composition may have a density in the range of 0.940 to 0.946 g/cm$^3$; or in the alternative, the polyethylene composition may have a density in the range of 0.946 to 0.953 g/cm$^3$; or in the alternative, the polyethylene composition may have a density in the range of 0.946 to 0.956 g/cm$^3$; or in the alternative, the polyethylene composition may have a density in the range of 0.948 to 0.956 g/cm$^3$; or in the alternative, the polyethylene composition may have a density in the range of 0.930 to 0.940 g/cm$^3$.

The polyethylene composition according to the instant invention has a molecular weight distribution ($M_w/M_n$) (measured according to the conventional GPC method) in the range of 1.70 to 3.62. All individual values and subranges from 1.70 to 3.62 are included herein and disclosed herein; for example, the molecular weight distribution ($M_w/M_n$) can be from a lower limit of 1.70, 1.80, 1.90, 2.10, 2.30, 2.50, 2.70, 2.90, 3.10, 3.30, or 3.50 to an upper limit of 1.85, 1.95, 2.15, 2.35, 2.55, 2.75, 2.95, 3.15, 3.35, 3.55, 3.60, or 3.62. For example, the polyethylene composition may have a molecular weight distribution ($M_w/M_n$) in the range of 1.70 to 3.60; or in the alternative, the polyethylene composition may have a molecular weight distribution ($M_w/M_n$) in the range of 1.70 to 3.55; or in the alternative, the polyethylene composition may have a molecular weight distribution ($M_w/M_n$) in the range of 1.70 to 3.35; or in the alternative, the polyethylene composition may have a molecular weight distribution ($M_w/M_n$) in the range of 1.70 to 3.15; or in the alternative, the polyethylene composition may have a molecular weight distribution ($M_w/M_n$) in the range of 1.70 to 2.95; or in the alternative, the polyethylene composition may have a molecular weight distribution ($M_w/M_n$) in the range of 1.70 to 2.75; or in the alternative, the polyethylene composition may have a molecular weight distribution ($M_w/M_n$) in the range of 1.70 to 2.55; or in the alternative, the polyethylene composition may have a molecular weight distribution ($M_w/M_n$) in the range of 1.70 to 2.35; or in the alternative, the polyethylene composition may have a molecular weight distribution ($M_w/M_n$) in the range of 1.70 to 2.15; or in the alternative, the polyethylene composition may have a molecular weight distribution ($M_w/M_n$) in the range of 1.70 to 1.95; or in the alternative, the polyethylene composition may have a molecular weight distribution ($M_w/M_n$) in the range of 1.70 to 1.85.

The polyethylene composition according to the instant invention has a melt index ($I_2$) in the range of 2 to 1000 g/10 minutes. All individual values and subranges from 2 to 1000 g/10 minutes are included herein and disclosed herein; for example, the melt index ($I_2$) can be from a lower limit of 2, 3, 5, 10, 20, 30, 40, 60, 80, or 100 g/10 minutes, to an upper limit of 10, 30, 50, 80, 90, 110, 200, 220, 250, 300, 500, 800, or 1000 g/10 minutes. For example, the polyethylene composition may have a melt index ($I_2$) in the range of 40 to 80 g/10 minutes; or in the alternative, the polyethylene composition may have a melt index ($I_2$) in the range of 80 to 250 g/10 minutes; or in the alternative, the polyethylene composition may have a melt index ($I_2$) in the range of 100 to 300 g/10 minutes; or in the alternative, the polyethylene composition may have a melt index ($I_2$) in the range of 60 to 110 g/10 minutes; or in the alternative, the polyethylene composition may have a melt index ($I_2$) in the range of 30 to 90 g/10 minutes; or in the alternative, the polyethylene composition may have a melt index ($I_2$) in the range of 3 to 30 g/10 minutes.

The polyethylene composition according to the instant invention has a melt index ($I_{21}$) in the range of 34 to 24000 g/10 minutes. All individual values and subranges from 34 to 24,000 g/10 minutes are included herein and disclosed herein; for example, the melt index ($I_{21}$) can be from a lower limit of 34, 43, 60, 500, 800, 1000, 1200, 1500, 1800, or 2000 g/10 minutes, to an upper limit of 24,000, 23,500, 20,000, 15,000, 10,000, 9,000, 8,000, 7,000, 6,000, 5,000, 4,000, 3,000, 2,500, 2,000, 1,800, 1,000, 800, 700, or 500 g/10 minutes. For example, the polyethylene composition may have a melt index ($I_{21}$) in the range of 860 to 1880 g/10 minutes; or in the alternative, the polyethylene composition may have a melt index ($I_{21}$) in the range of 1,880 to 5,875 g/10 minutes; or in the alternative, the polyethylene composition may have a melt index ($I_{21}$) in the range of 2,150 to 7,050 g/10 minutes; or in the alternative, the polyethylene composition may have a melt index ($I_{21}$) in the range of 1,290 to 2,585 g/10 minutes; or in the alternative, the polyethylene composition may have a melt index ($I_{21}$) in the range of 645 to 2,115 g/10 minutes; or in the alternative, the polyethylene composition may have a melt index ($I_{21}$) in the range of 64.5 to 705 g/10 minutes.

The polyethylene composition according to the instant invention has a melt flow ratio ($I_{21}/I_2$) in the range of 17 to 24. All individual values and subranges from 17 to 24 minutes are included herein and disclosed herein; for example, the melt flow ratio ($I_{21}/I_2$) can be from a lower limit of 17, 17.5, 18, 18.5, 19, 19.5, 20, 20.5, 21, 21.5, 22, 22.5, or 23.5 to an upper limit of 18, 18.5, 19, 19.5, 20, 20.5, 21, 21.5, 22, 22.5, 23.5 or 24. For example, the polyethylene composition may have a melt flow ratio ($I_{21}/I_2$) in the range 17 to 23; or in the alternative, the polyethylene composition may have a melt flow ratio ($I_{21}/I_2$) in the range 17 to 22; or in the alternative, the polyethylene composition may have a melt flow ratio ($I_{21}/I_2$) in the range 18 to 24; or in the alternative, the polyethylene composition may have a melt flow ratio ($I_{21}/I_2$) in the range 18 to 23; or in the alternative, the polyethylene composition may have a melt flow ratio ($I_{21}/I_2$) in the range 19 to 24; or in the alternative, the polyethylene composition may have a melt flow ratio ($I_{21}/I_2$) in the range 19 to 23; or in the alternative, the polyethylene composition may have a melt flow ratio ($I_{21}/I_2$) in the range 21 to 24; or in the alternative, the polyethylene composition may have a melt flow ratio ($I_{21}/I_2$) in the range 21 to 23.

The polyethylene composition according to the instant invention has a molecular weight ($M_w$) in the range of 15,000 to 100,000 daltons. All individual values and subranges from 15,000 to 100,000 daltons are included herein and disclosed herein; for example, the molecular weight ($M_w$) can be from a lower limit of 15,000, 20,000, 25,000, 30,000, 34,000, 40,000, 50,000, 60,000, 70,000, 80,000, 90,000, or 95,000 daltons to an upper limit of 20,000, 25,000, 30,000, 33,000, 40,000, 50,000, 60,000, 70,000, 80,000, 90,000, 95,000, 100,000. For example, the polyethylene composition may have a molecular weight ($M_w$) in the range of 15,000 to 100,000 daltons; or in the alternative, the polyethylene composition may have a molecular weight ($M_w$) in the range of 15,000 to 100,000 daltons; or in the alternative, the polyethylene composition may have a molecular weight ($M_w$) in the range of 15,000 to 90,000 daltons; or in the alternative, the polyethylene composition may have a molecular weight ($M_w$) in the range of 20,000 to 80,000 daltons; or in the alternative, the polyethylene composition may have a molecular weight ($M_w$) in the range of 30,000 to 70,000 daltons; or in the alternative, the polyethylene composition may have a molecular weight ($M_w$) in the range of 34,000 to 65,000 daltons; or in the alternative, the polyethylene composition may have a molecular weight ($M_w$) in the range of 15000 to 50,000 daltons; or in the alternative, the polyethylene composition may have a molecular weight ($M_w$) in the range of 20,000 to 40,000 daltons; or in the alternative, the polyethylene composition may have a molecular weight ($M_w$) in the range of 20,000 to 33,000 daltons.

The polyethylene composition may have molecular weight distribution ($M_z/M_w$) (measured according to the conventional GPC method) in the range of less than 5. All individual values and subranges from less than 5 are included herein and disclosed herein; for example, the polyethylene composition may have a molecular weight distribution ($M_z/M_w$) in the range of less than 4.5; or in the alternative, the polyethylene composition may have a molecular weight distribution ($M_z/M_w$) in the range of less than 4; or in the alternative, the polyethylene composition may have a molecular weight distribution ($M_z/M_w$) in the range of less than 3.5; or in the alternative, the polyethylene composition may have a molecular weight distribution ($M_z/M_w$) in the range of less than 3.0; or in the alternative, the polyethylene composition may have a molecular weight distribution ($M_z/M_w$) in the range of less than 2.8; or in the alternative, the polyethylene composition may have a molecular weight distribution ($M_z/M_w$) in the range of less than 2.6; or in the alternative, the polyethylene composition may have a molecular weight distribution ($M_z/M_w$) in the range of less than 2.5; or in the alternative, the polyethylene composition may have a molecular weight distribution ($M_z/M_w$) in the range of less than 2.4; or in the alternative, the polyethylene composition may have a molecular weight distribution ($M_z/M_w$) in the range of less than 2.3; or in the alternative, the polyethylene composition may have a molecular weight distribution ($M_z/M_w$) in the range of less than 2.2.

The polyethylene composition may have a vinyl unsaturation of less than 0.1 vinyls per one thousand carbon atoms present in the backbone of the polyethylene composition. All individual values and subranges from less than 0.1 are included herein and disclosed herein; for example, the polyethylene composition may have a vinyl unsaturation of less than 0.08 vinyls per one thousand carbon atoms present in the backbone of the polyethylene composition; or in the alternative, the polyethylene composition may have a vinyl unsaturation of less than 0.06 vinyls per one thousand carbon atoms present in the backbone of the polyethylene composition; or in the alternative, the polyethylene composition may have a vinyl unsaturation of less than 0.04 vinyls per one thousand carbon atoms present in the backbone of the polyethylene composition; or in the alternative, the polyethylene composition may have a vinyl unsaturation of less than 0.02 vinyls per one thousand carbon atoms present in the backbone of the polyethylene composition; or in the alternative, the polyethylene composition may have a vinyl unsaturation of less than 0.01 vinyls per one thousand carbon atoms present in the backbone of the polyethylene composition; or in the alternative, the polyethylene composition may have a vinyl unsaturation of less than 0.001 vinyls per one thousand carbon atoms present in the backbone of the polyethylene composition.

The polyethylene composition may comprise less than 15 percent by weight of units derived from one or more α-olefin comonomers. All individual values and subranges from less than 15 weight percent are included herein and disclosed herein; for example, the polyethylene composition may comprise less than 12 percent by weight of units derived from one or more α-olefin comonomers; or in the alternative, the polyethylene composition may comprise less than 11 percent by weight of units derived from one or more α-olefin comonomers; or in the alternative, the polyethylene composition may comprise less than 9 percent by weight of units derived from one or more α-olefin comonomers; or in the alternative, the polyethylene composition may comprise less than 7 percent by weight of units derived from one or more α-olefin comonomers; or in the alternative, the polyethylene composition may comprise less than 5 percent by weight of units derived from one or more α-olefin comonomers; or in the alternative, the polyethylene composition may comprise less than 3 percent by weight of units derived from one or more α-olefin comonomers; or in the alternative, the polyethylene composition may comprise less than 1 percent by weight of units derived from one or more α-olefin comonomers; or in the alternative, the polyethylene composition may comprise less than 0.5 percent by weight of units derived from one or more α-olefin comonomers.

The α-olefin comonomers typically have no more than 20 carbon atoms. For example, the α-olefin comonomers may preferably have 3 to 10 carbon atoms, and more preferably 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-hexene and 1-octene.

The polyethylene composition may comprise at least 85 percent by weight of units derived from ethylene. All individual values and subranges from at least 85 weight percent are included herein and disclosed herein; for example, the polyethylene composition may comprise at least 88 percent by weight of units derived from ethylene; or in the alternative, the polyethylene composition may comprise at least 89 percent by weight of units derived from ethylene; or in the alternative, the polyethylene composition may comprise at least 91 percent by weight of units derived from ethylene; or in the alternative, the polyethylene composition may comprise at least 93 percent by weight of units derived from ethylene; or in the alternative, the polyethylene composition may comprise at least 95 percent by weight of units derived from ethylene; or in the alternative, the polyethylene composition may comprise at least 97 percent by weight of units derived from ethylene; or in the alternative, the polyethylene composition may comprise at least 99 percent by weight of units derived from ethylene; or in the alternative, the polyethylene composition may comprise at least 99.5 percent by weight of units derived from ethylene.

The polyethylene composition of the instant invention is substantially free of any long chain branching, and preferably, the polyethylene composition of the instant invention is free of any long chain branching. Substantially free of any long chain branching, as used herein, refers to a polyethylene composition preferably substituted with less than about 0.1 long chain branching per 1000 total carbons, and more preferably, less than about 0.01 long chain branching per 1000 total carbons. In the alternative, the polyethylene composition of the instant invention is free of any long chain branching.

Figure 2:
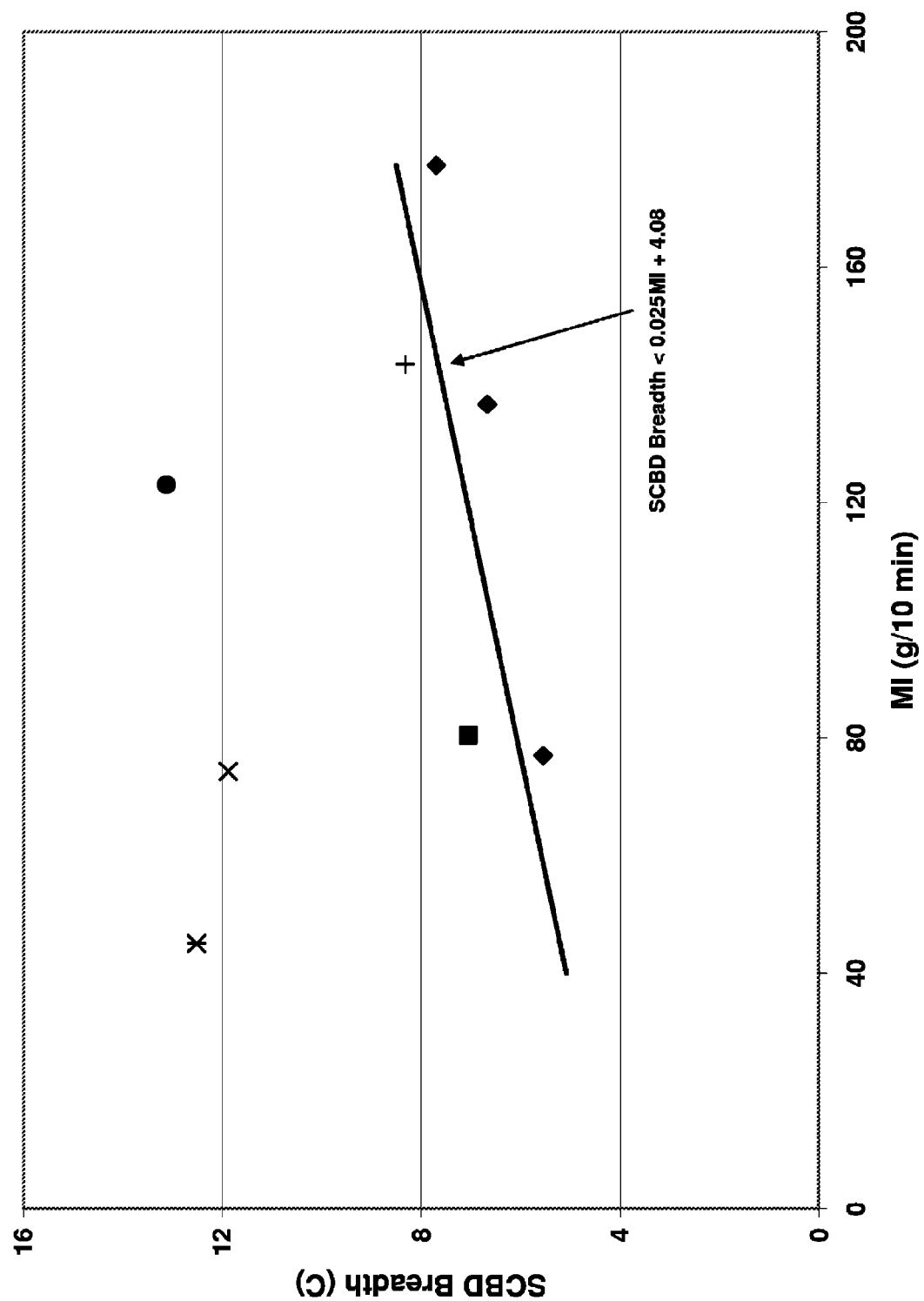
FIG. 2 illustrates the relationship between the short chain branching distribution breadth expressed in ° C. and melt index ($I_2$) expressed in g/10 minutes of the inventive samples versus the comparative samples, wherein the inventive samples have a density in the range of 0.930 to less than 0.940 g/cm$^3$.
Figure 3:
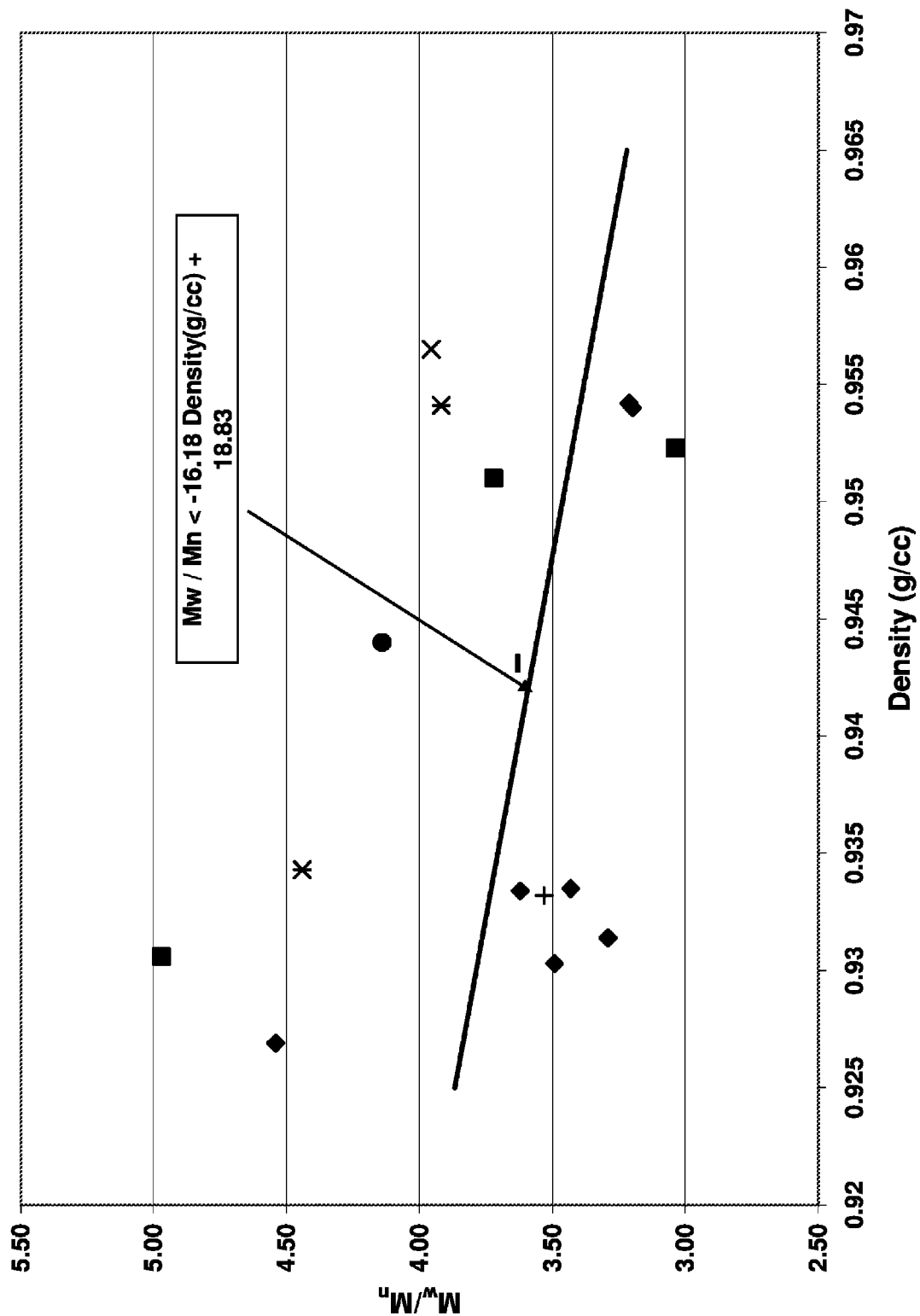
FIG. 3 illustrates the relationship between the molecular weight distribution ($M_w/M_n$) and density expressed in g/cm$^3$ of the inventive samples versus the comparative samples.
Figure 4:
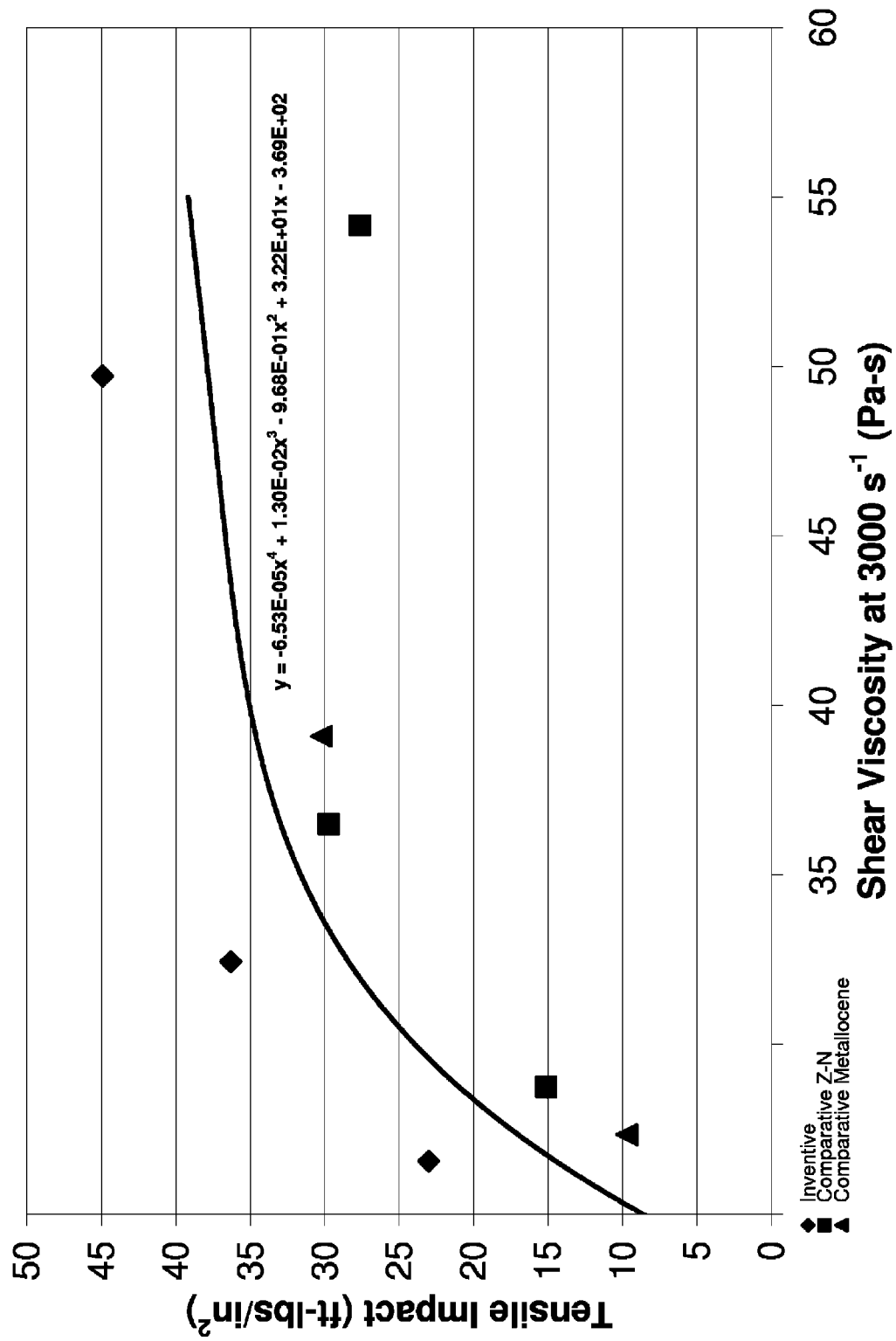
FIG. 4 illustrates the relationship between the tensile impact expressed in ft-lbs/in$^2$ and shear viscosity at 3000 s$^{-1}$ at 190° C. expressed in Pa-s of the inventive samples versus the comparative samples.
Figure 5:
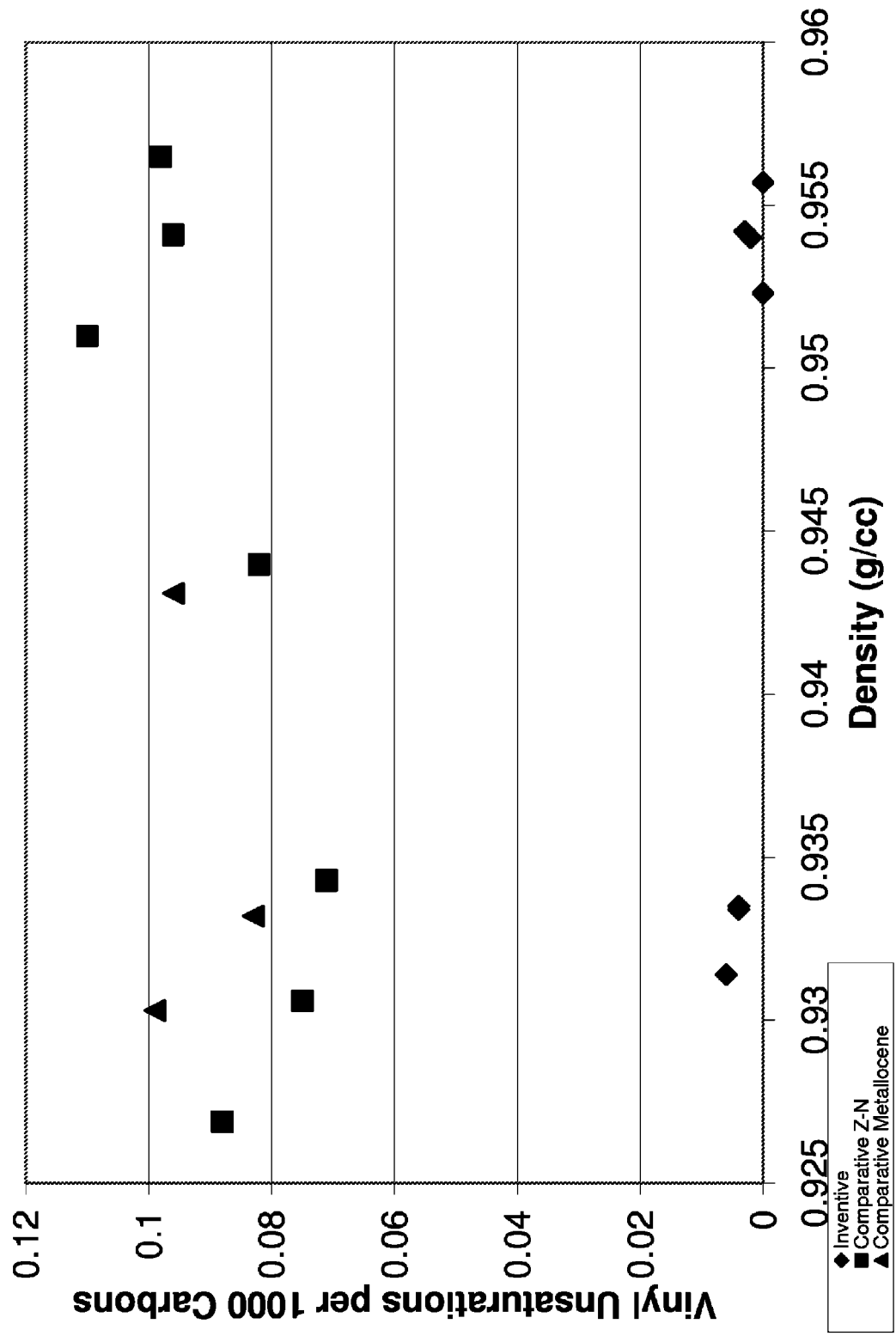
FIG. 5 illustrates the relationship between the vinyl unsaturations per 1000 carbons and density expressed in g/cm$^3$ of the inventive samples versus the comparative samples.
Figure 6:
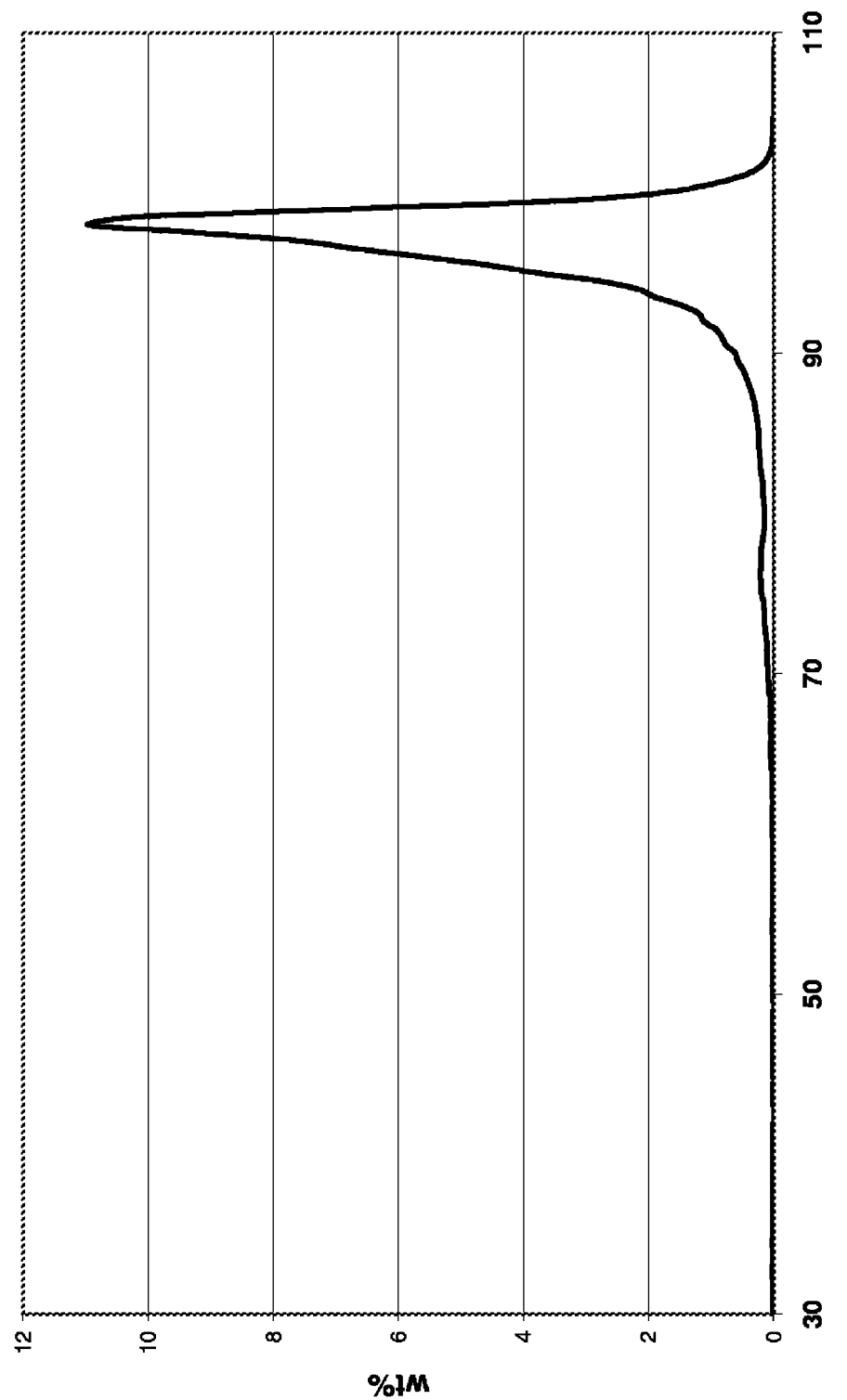
FIG. 6 is the elution temperature-eluted amount curve of a first inventive polyethylene composition having a melt index ($I_2$) of approximately 40 g/10 minutes determined by a continuous temperature rising elution fraction method at equal or above 30° C., wherein the purge peak which is below 30° C. is excluded.
Figure 7:
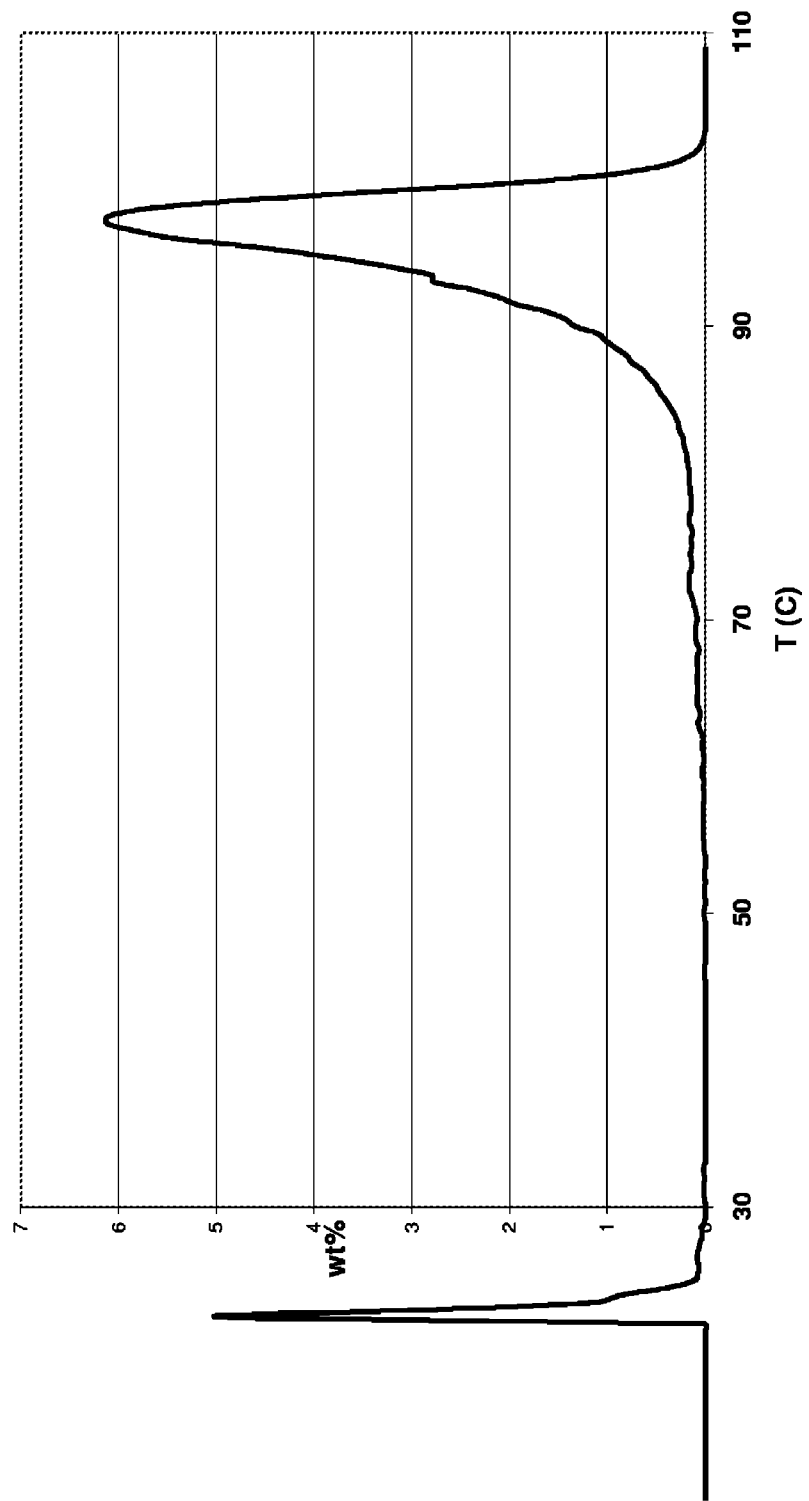
FIG. 7 is the elution temperature-eluted amount curve of a second inventive polyethylene composition having a melt index ($I_2$) of approximately 80 g/10 minutes determined by a continuous temperature rising elution fraction method at equal or above 30° C., wherein the purge peak which is below 30° C. is excluded.
Figure 8:
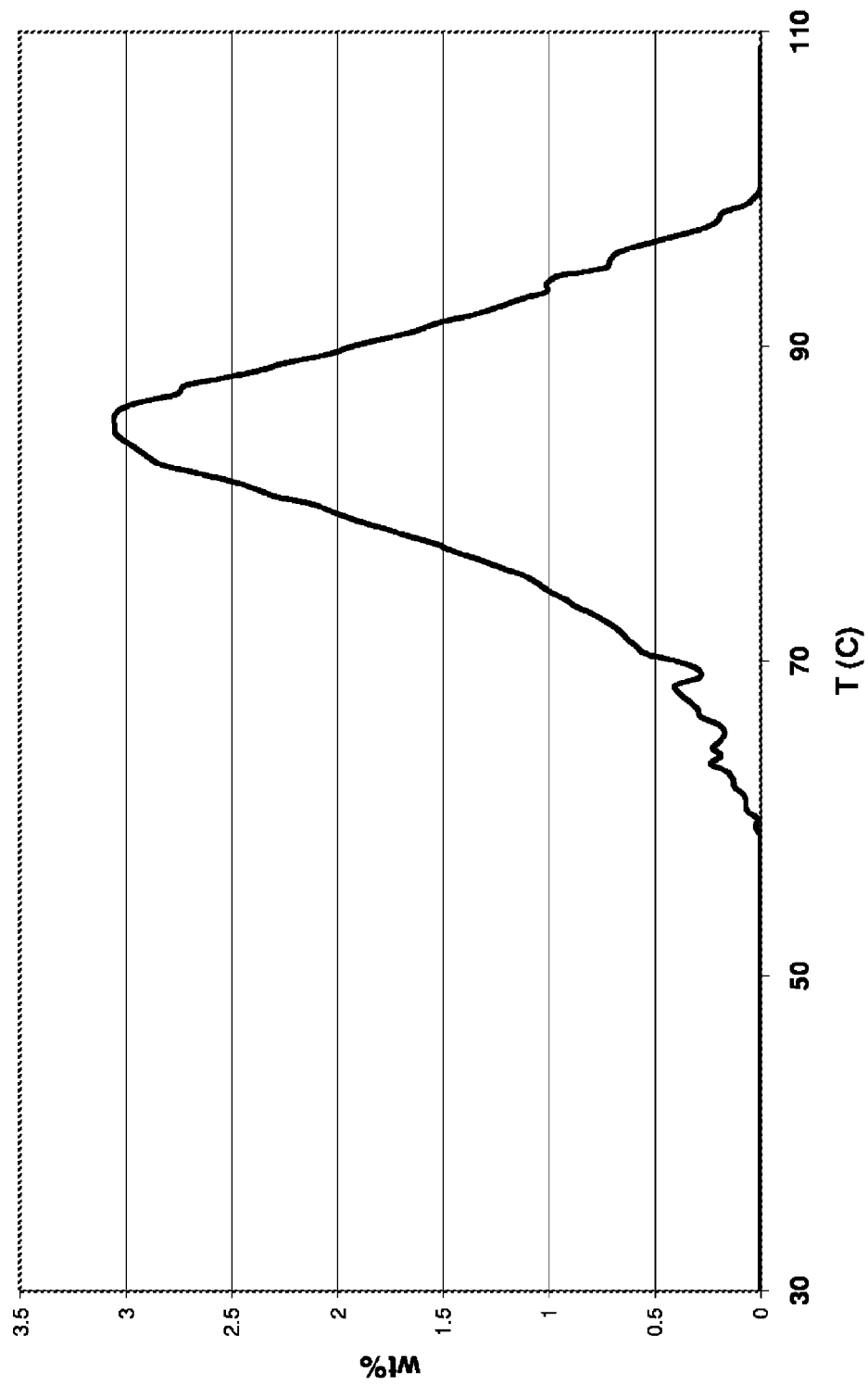
FIG. 8 is the elution temperature-eluted amount curve of a third inventive polyethylene composition having a melt index ($I_2$) of approximately 85 g/10 minutes determined by a continuous temperature rising elution fraction method at equal or above 30° C., wherein the purge peak which is below 30° C. is excluded and wherein the single peak also includes artifacts generated due to instrumental noise on the low temp side of the peak.
Figure 9:
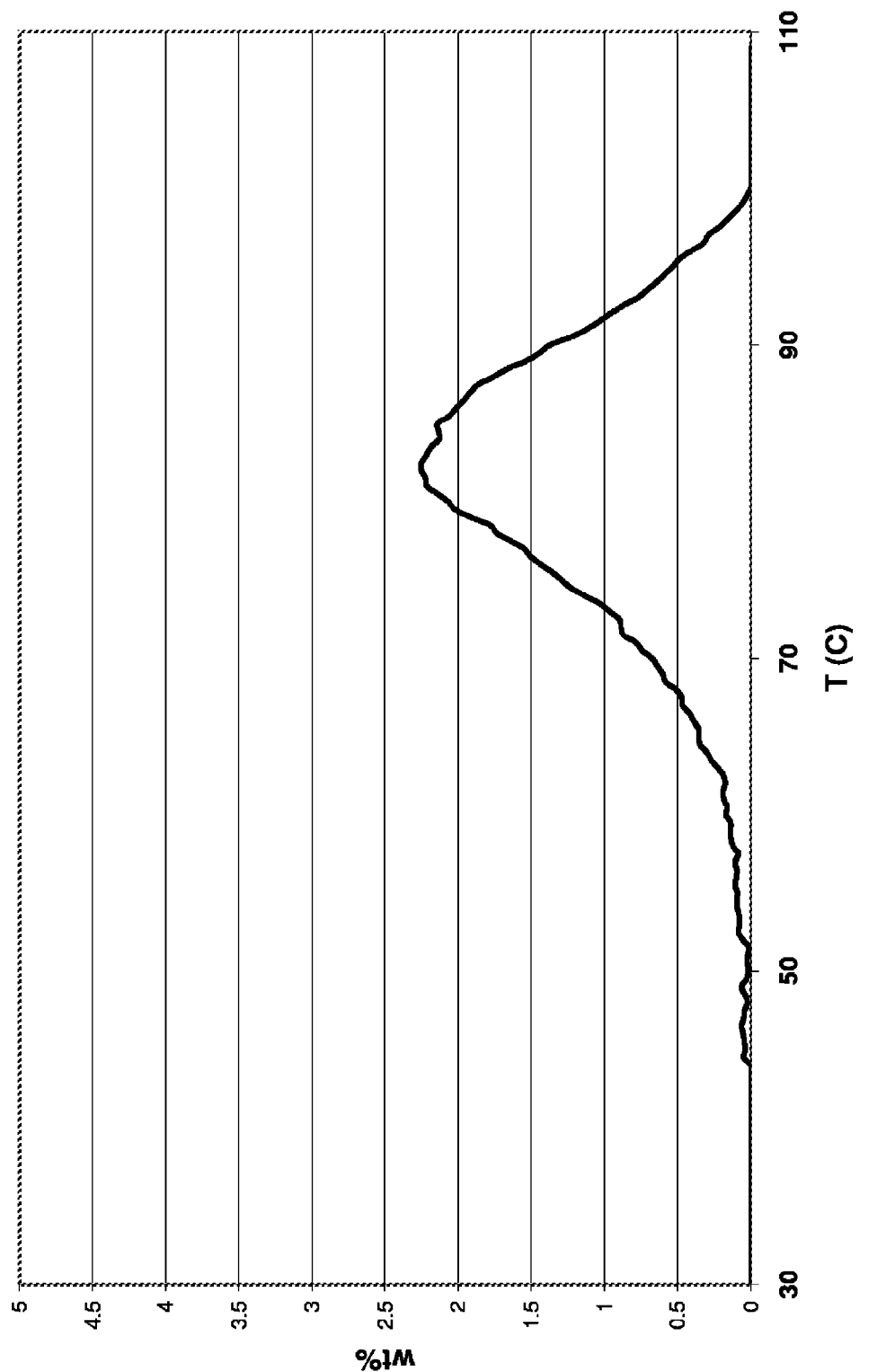
FIG. 9 is the elution temperature-eluted amount curve of a fourth inventive polyethylene composition having a melt index ($I_2$) of approximately 150 g/10 minutes determined by a continuous temperature rising elution fraction method at equal or above 30° C., wherein the purge peak which is below 30° C. is excluded.
Figure 10:
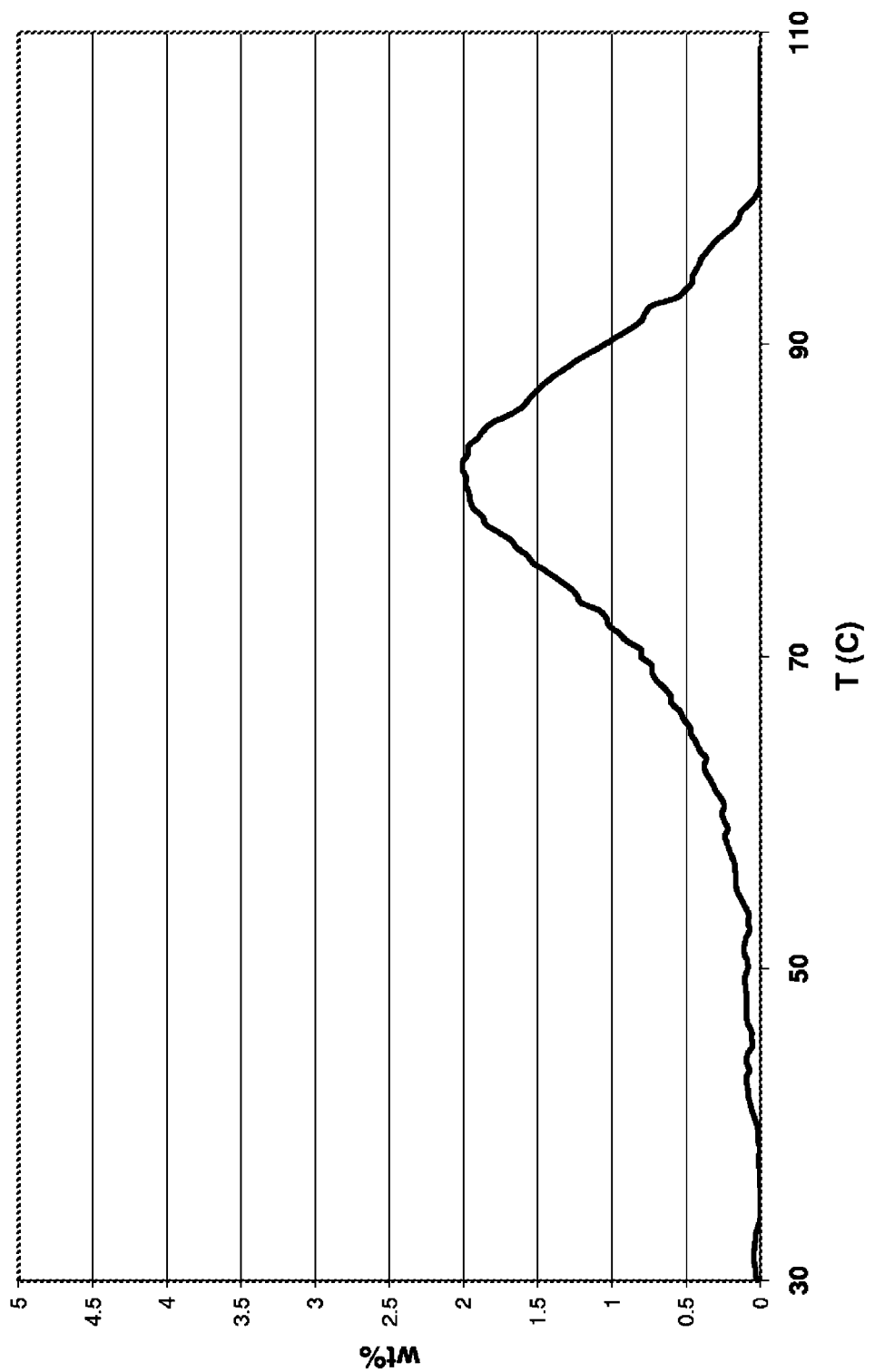
FIG. 10 is the elution temperature-eluted amount curve of a fifth inventive polyethylene composition having a melt index ($I_2$) of approximately 200 g/10 minutes determined by a continuous temperature rising elution fraction method at equal or above 30° C., wherein the purge peak which is below 30° C. is excluded.

The polyethylene composition may have a short chain branching distribution breadth (SCBDB) in the range of 2 to 40° C. All individual values and subranges from 2 to 40° C. are included herein and disclosed herein; for example, the short chain branching distribution breadth (SCBDB) can be from a lower limit of 2, 3, 4, 5, 6, 8, 10, 12, 15, 18, 20, 25, or 30° C. to an upper limit of 40, 35, 30, 29, 27, 25, 22, 20, 15, 12, 10, 8, 6, 4, or 3° C. For example, the polyethylene composition may have a short chain branching distribution breadth (SCBDB) in the range of 2 to 35° C.; or in the alternative, the polyethylene composition may have a short chain branching distribution breadth (SCBDB) in the range of 2 to 30° C.; or in the alternative, the polyethylene composition may have a short chain branching distribution breadth (SCBDB) in the range of 2 to 25° C.; or in the alternative, the polyethylene composition may have a short chain branching distribution breadth (SCBDB) in the range of 2 to 20° C.; or in the alternative, the polyethylene composition may have a short chain branching distribution breadth (SCBDB) in the range of 2 to 15° C.; or in the alternative, the polyethylene composition may have a short chain branching distribution breadth (SCBDB) in the range of 2 to 10° C.; or in the alternative, the polyethylene composition may have a short chain branching distribution breadth (SCBDB) in the range of 2 to 5° C.; or in the alternative, the polyethylene composition may have a short chain branching distribution breadth (SCBDB) in the range of 4 to 35° C.; or in the alternative, the polyethylene composition may have a short chain branching distribution breadth (SCBDB) in the range of 4 to 30° C.; or in the alternative, the polyethylene composition may have a short chain branching distribution breadth (SCBDB) in the range of 4 to 25° C.; or in the alternative, the polyethylene composition may have a short chain branching distribution breadth (SCBDB) in the range of 4 to 20° C.; or in the alternative, the polyethylene composition may have a short chain branching distribution breadth (SCBDB) in the range of 4 to 15° C.; or in the alternative, the polyethylene composition may have a short chain branching distribution breadth (SCBDB) in the range of 4 to 10° C.; or in the alternative, the polyethylene composition may have a short chain branching distribution breadth (SCBDB) in the range of 4 to 5° C. Referring to FIG. 1, the polyethylene composition in accordance with the instant invention may have a short chain branching distribution breadth (SCBDB) expressed in ° C. of less than or equal to [0.0312 ($I_2$)+2.87], wherein $I_2$ is melt index expressed in g/10 min, and wherein the polyethylene composition has a density in the range of equal or greater than 0.940 g/cm³, for example, 0.940 to 0.975 g/cm³. Referring to FIG. 2, in the alternative, the polyethylene composition in accordance with the instant invention may have a short chain branching distribution breadth (SCBDB) expressed in ° C. of less than or equal to [0.025 (I$_2$)+4.08], wherein I$_2$ is melt index expressed in g/10 min, and wherein the polyethylene composition has a density in the range of equal or greater than 0.930 g/cm$^3$ to less than 0.940 g/cm$^3$.

The polyethylene composition in accordance with the instant invention may further have any tensile impact strength expressed in ft-lb/in$^2$. For example, the polyethylene composition in accordance with the instant invention may have a tensile impact strength in the range of 5 to 120 ft-lb/in$^2$. All individual values and subranges from 5 to 120 ft-lb/in$^2$ are included herein and disclosed herein; for example, the tensile impact strength can be from a lower limit of 5, 10, 15, 20, 25, 30, 35, 40, or 45 ft-lb/in$^2$ to an upper limit of 20, 30, 40, 50, 60, 70, 80, 90, 100, 110, or 120 ft-lb/in$^2$. For example, the inventive polyethylene composition may have a tensile impact strength in the range of 5 to 90 ft-lb/in$^2$; or in the alternative, the inventive polyethylene composition may have a tensile impact strength in the range of 5 to 50 ft-lb/in$^2$; or in the alternative, the inventive polyethylene composition may have a tensile impact strength in the range of 5 to 40 ft-lb/in$^2$; or in the alternative, the inventive polyethylene composition may have a tensile impact strength in the range of 5 to 30 ft-lb/in$^2$; or in the alternative, the inventive polyethylene composition may have a tensile impact strength in the range of 5 to 20 ft-lb/in$^2$; or in the alternative, the inventive polyethylene composition may have a tensile impact strength in the range of 10 to 50 ft-lb/in$^2$; or in the alternative, the inventive polyethylene composition may have a tensile impact strength in the range of 10 to 40 ft-lb/in$^2$; or in the alternative, the inventive polyethylene composition may have a tensile impact strength in the range of 10 to 30 ft-lb/in$^2$; or in the alternative, the inventive polyethylene composition may have a tensile impact strength in the range of 10 to 20 ft-lb/in$^2$; or in the alternative, the inventive polyethylene composition may have a tensile impact strength in the range of 20 to 50 ft-lb/in$^2$; or in the alternative, the inventive polyethylene composition may have a tensile impact strength in the range of 20 to 40 ft-lb/in$^2$; or in the alternative, the inventive polyethylene composition may have a tensile impact strength in the range of 20 to 35 ft-lb/in$^2$; or in the alternative, the inventive polyethylene composition may have a tensile impact strength in the range of 20 to 30 ft-lb/in$^2$; or in the alternative, the inventive polyethylene composition may have a tensile impact strength in the range of 15 to 5 ft-lb/in$^2$.

The polyethylene composition may have a shear viscosity in the range of 20 to 250 Pascal-s at 3000 s$^{-1}$ shear rate measured at 190° C. All individual values and subranges from 20 to 250 Pascal-s at 3000 s$^{-1}$ shear rate measured at 190° C. are included herein and disclosed herein; for example, the polyethylene composition may have a shear viscosity in the range of 20 to 200 Pascal-s at 3000 s$^{-1}$ shear rate measured at 190° C.; or in the alternative, the polyethylene composition may have a shear viscosity in the range of 20 to 150 Pascal-s at 3000 s$^{-1}$ shear rate measured at 190° C.; or in the alternative, the polyethylene composition may have a shear viscosity in the range of 20 to 130 Pascal-s at 3000 s$^{-1}$ shear rate measured at 190° C.; or in the alternative, the polyethylene composition may have a shear viscosity in the range of 25 to 150 Pascal-s at 3000 s$^{-1}$ shear rate measured at 190° C.; or in the alternative, the polyethylene composition may have a shear viscosity in the range of 25 to 80 Pascal-s at 3000 s$^{-1}$ shear rate measured at 190° C.; or in the alternative, the polyethylene composition may have a shear viscosity in the range of 25 to 55 Pascal-s at 3000 s$^{-1}$ shear rate measured at 190° C.; or in the alternative, the polyethylene composition may have a shear viscosity in the range of 25 to 50 Pascal-s at 3000 s$^{-1}$ shear rate measured at 190° C.; or in the alternative, the polyethylene composition may have a shear viscosity in the range of 25 to 45 Pascal-s at 3000 s$^{-1}$ shear rate measured at 190° C.; or in the alternative, the polyethylene composition may have a shear viscosity in the range of 25 to 45 Pascal-s at 3000 s$^{-1}$ shear rate measured at 190° C.; or in the alternative, the polyethylene composition may have a shear viscosity in the range of 25 to 35 Pascal-s at 3000 s$^{-1}$ shear rate measured at 190° C.; or in the alternative, the polyethylene composition may have a shear viscosity in the range of 25 to 30 Pascal-s at 3000 s$^{-1}$ shear rate measured at 190° C.; or in the alternative, the polyethylene composition may have a shear viscosity in the range of 30 to 55 Pascal-s at 3000 s$^{-1}$ shear rate measured at 190° C.; or in the alternative, the polyethylene composition may have a shear viscosity in the range of 35 to 55 Pascal-s at 3000 s$^{-1}$ shear rate measured at 190° C.; or in the alternative, the polyethylene composition may have a shear viscosity in the range of 40 to 55 Pascal-s at 3000 s$^{-1}$ shear rate measured at 190° C.; or in the alternative, the polyethylene composition may have a shear viscosity in the range of 45 to 55 Pascal-s at 3000 s$^{-1}$ shear rate measured at 190° C.; or in the alternative, the polyethylene composition may have a shear viscosity in the range of 50 to 55 Pascal-s at 3000 s$^{-1}$ shear rate measured at 190° C.

The polyethylene composition may further have a 1% secant modulus in the range of 65,000 to 250,000 psi. All individual values and subranges from 65,000 to 250,000 psi are included herein and disclosed herein; for example, the 1% secant modulus can be from a lower limit of 65,000, 75,000, 80,000, 85,000, 90,000, 100,000, or 120,000 psi to an upper limit of 250,000, 220,000, 200,000, 150,000, 140,000, 130,000, 115,000, 110,000, 105,000, 100,000, 95,000, 90,000, 85,000, or 80,000. For example, the polyethylene composition may have a 1% secant modulus in the range of 65,000 to 200,000 psi; or in the alternative, the polyethylene composition may have a 1% secant modulus in the range of 65,000 to 150,000 psi; or in the alternative, the polyethylene composition may have a 1% secant modulus in the range of 65,000 to 140,000 psi; or in the alternative, the polyethylene composition may have a 1% secant modulus in the range of 65,000 to 120,000 psi; or in the alternative, the polyethylene composition may have a 1% secant modulus in the range of 65,000 to 115,000 psi; or in the alternative, the polyethylene composition may have a 1% secant modulus in the range of 150,000 to 200,000 psi; or in the alternative, the polyethylene composition may have a 1% secant modulus in the range of 75,000 to 110,000 psi; or in the alternative, the polyethylene composition may have a 1% secant modulus in the range of 75,000 to 100,000 psi; or in the alternative, the polyethylene composition may have a 1% secant modulus in the range of 75,000 to 95,000 psi; or in the alternative, the polyethylene composition may have a 1% secant modulus in the range of 75,000 to 90,000 psi; or in the alternative, the polyethylene composition may have a 1% secant modulus in the range of 80,000 to 95,000 psi; or in the alternative, the polyethylene composition may have a 1% secant modulus in the range of 80,000 to 90,000 psi.

In one embodiment, the polyethylene composition in accordance with the instant invention may have a tensile impact strength expressed in ft-lb/in$^2$ of equal or greater than $[(6.53*10^{-5})(x^4)]+[(1.3*10^{-2})(x^3)]-[(9.68*10^{-1})(x^2)]+[(3.22*10)(x)]-[(3.69*10^2)]$, wherein x is the shear viscosity of the polyethylene composition expressed in Pascal-s at 3000 s$^{-1}$ shear rate measured at 190° C. In another embodiment, the inventive polyethylene composition may have a tensile impact strength expressed in ft-lb/in$^2$ of equal or greater than $[(6.53*10^{-5})(x^4)]+[(1.3*10^{-2})(x^3)]-[(9.68*10^{-1})(x^2)]+[(3.22*10)(x)]-[(3.69*10^2)]$, wherein x is the shear viscosity of the polyethylene composition in the range of 25 to 55 expressed in Pascal-s at 3000 s$^{-1}$ shear rate measured at 190° C. In another embodiment, the inventive polyethylene composition may have a tensile impact strength expressed in ft-lb/in$^2$ of equal or greater than $[(6.53*10^{-5})(x^4)]+[(1.3*10^{-2})(x^3)]-[(9.68*10^{-1})(x^2)]+[(3.22*10)(x)]-[(3.69*10^2)]$, wherein x is the shear viscosity of the polyethylene composition in the range of 25 to 55 expressed in Pascal-s at 3000 s$^{-1}$ shear rate measured at 190° C., and wherein the inventive polyethylene composition has a 1% secant modulus in the range of 75,000 to 115,000 psi. In another embodiment, the inventive polyethylene composition may have a tensile impact strength expressed in ft-lb/in$^2$ of equal or greater than $[(-6.53*10^{-5})(x^4)]+[(1.3*10^{-2})(x^3)]-[(9.68*10^{-1})(x^2)]+[(3.22*10)(x)]-[(3.69*10^2)]$, wherein x is the shear viscosity of the polyethylene composition expressed in Pascal-s at 3000 s$^{-1}$ shear rate measured at 190° C., and wherein the inventive polyethylene composition has a 1% secant modulus in the range of 75,000 to 115,000 psi. In another embodiment, the inventive polyethylene composition may have a tensile impact strength expressed in ft-lb/in$^2$ of equal or greater than $[(-6.53*10^{-5})(x^4)]+[(1.3*10^{-2})(x^3)]-[(9.68*10^{-1})(x^2)]+[(3.22*10)(x)]-[(3.69*10^2)]$, wherein x is the shear viscosity of the polyethylene composition expressed in Pascal-s at 3000 s$^{-1}$ shear rate measured at 190° C., and wherein the inventive polyethylene composition has a 1% secant modulus in the range of 75,000 to 110,000 psi. In another alternative embodiment, the inventive polyethylene composition may have a tensile impact strength expressed in ft-lb/in$^2$ of equal or greater than $[(6.53*10^{-5})(x^4)]+[(1.3*10^{-2})(x^3)]-[(9.68*10^{-1})(x^2)]+[(3.22*10)(x)]-[(3.69*10^2)]$, wherein x is the shear viscosity of the polyethylene composition expressed in Pascal-s at 3000 s$^{-1}$ shear rate measured at 190° C., and wherein the inventive polyethylene composition has a 1% secant modulus in the range of 75,000 to 100,000 psi. In another alternative embodiment, the inventive polyethylene composition may have a tensile impact strength expressed in ft-lb/in$^2$ of equal or greater than $[(6.53*10^{-5})(x^4)]+[(1.3*10^{-2})(x^3)]-[(9.68*10^{-1})(x^2)]+[(3.22*10)(x)]-[(3.69*10^2)]$, wherein x is the shear viscosity of the polyethylene composition expressed in Pascal-s at 3000 s$^{-1}$ shear rate measured at 190° C., and wherein the inventive polyethylene composition has a 1% secant modulus in the range of 75,000 to 95,000 psi. In another alternative embodiment, the inventive polyethylene composition may have a tensile impact strength expressed in ft-lb/in$^2$ of equal or greater than $[(-6.53*10^{-5})(x^4)]+[(1.3*10^{-2})(x^3)]-[(9.68*10^{-1})(x^2)]+[(3.22*10)(x)]-[(3.69*10^2)]$, wherein x is the shear viscosity of the polyethylene composition expressed in Pascal-s at 3000 s$^{-1}$ shear rate measured at 190° C., and wherein the inventive polyethylene composition has a 1% secant modulus in the range of 75,000 to 90,000 psi. In another alternative embodiment, the inventive polyethylene composition may have a tensile impact strength expressed in ft-lb/in$^2$ of equal or greater than $[(6.53*10^{-5})(x^4)]+[(1.3*10^{-2})(x^3)]-[(9.68*10^{-1})(x^2)]+[(3.22*10)(x)]-[(3.69*10^2)]$, wherein x is the shear viscosity of the polyethylene composition expressed in Pascal-s at 3000 s$^{-1}$ shear rate measured at 190° C., and wherein the inventive polyethylene composition has a 1% secant modulus in the range of 80,000 to 95,000 psi. In another alternative embodiment, the inventive polyethylene composition may have a tensile impact strength expressed in ft-lb/in$^2$ of equal or greater than $[(6.53*10^{-5})(x^4)]+[(1.3*10^{-2})(x^3)]-[(9.68*10^{-1})(x^2)]+[(3.22*10)(x)]-[(3.69*10^2)]$, wherein x is the shear viscosity of the polyethylene composition expressed in Pascal-s at 3000 s$^{-1}$ shear rate measured at 190° C., and wherein the inventive polyethylene composition has a 1% secant modulus in the range of 80,000 to 100,000 psi.

The polyethylene composition may further comprise less than or equal to 100 parts by weight of hafnium residues remaining from the hafnium based metallocene catalyst per one million parts of polyethylene composition. All individual values and subranges from less than or equal to 100 ppm are included herein and disclosed herein; for example, the polyethylene composition may further comprise less than or equal to 10 parts by weight of hafnium residues remaining from the hafnium based metallocene catalyst per one million parts of polyethylene composition; or in the alternative, the polyethylene composition may further comprise less than or equal to 8 parts by weight of hafnium residues remaining from the hafnium based metallocene catalyst per one million parts of polyethylene composition; or in the alternative, the polyethylene composition may further comprise less than or equal to 6 parts by weight of hafnium residues remaining from the hafnium based metallocene catalyst per one million parts of polyethylene composition; or in the alternative, the polyethylene composition may further comprise less than or equal to 4 parts by weight of hafnium residues remaining from the hafnium based metallocene catalyst per one million parts of polyethylene composition; or in the alternative, the polyethylene composition may further comprise less than or equal to 2 parts by weight of hafnium residues remaining from the hafnium based metallocene catalyst per one million parts of polyethylene composition; or in the alternative, the polyethylene composition may further comprise less than or equal to 1.5 parts by weight of hafnium residues remaining from the hafnium based metallocene catalyst per one million parts of polyethylene composition; or in the alternative, the polyethylene composition may further comprise less than or equal to 1 parts by weight of hafnium residues remaining from the hafnium based metallocene catalyst per one million parts of polyethylene composition; or in the alternative, the polyethylene composition may further comprise less than or equal to 0.75 parts by weight of hafnium residues remaining from the hafnium based metallocene catalyst per one million parts of polyethylene composition; or in the alternative, the polyethylene composition may further comprise less than or equal to 0.5 parts by weight of hafnium residues remaining from the hafnium based metallocene catalyst per one million parts of polyethylene composition the polyethylene composition may further comprise less than or equal to 0.25 parts by weight of hafnium residues remaining from the hafnium based metallocene catalyst per one million parts of polyethylene composition. The hafnium residues remaining from the hafnium based metallocene catalyst in the inventive polyethylene composition may be measured by x-ray fluorescence (XRF), which is calibrated to reference standards. The polymer resin granules were compression molded at elevated temperature into plaques having a thickness of about ⅜ of an inch for the x-ray measurement in a preferred method. At very low concentrations of metal, such as below 0.1 ppm, ICP-AES would be a suitable method to determine metal residues present in the inventive polyethylene composition. In one embodiment, the inventive polyethylene composition has substantially no chromium, zirconium or titanium content, that is, no or only what would be considered by those skilled in the art, trace amounts of these metals are present, such as, for example, less than 0.001 ppm.

The polyethylene composition in accordance with the instant invention may have less than 2 peaks on an elution temperature-eluted amount curve determined by continuous temperature rising elution fraction method at equal or above 30° C., wherein the purge peak which is below 30° C. is excluded. In the alternative, the polyethylene composition may have only 1 peak or less on an elution temperature-eluted amount curve determined by continuous temperature rising elution fraction method at equal or above 30° C., wherein the purge peak which is below 30° C. is excluded. In the alternative, the polyethylene composition may have only 1 peak on an elution temperature-eluted amount curve determined by continuous temperature rising elution fraction method at equal or above 30° C., wherein the purge peak which is below 30° C. is excluded. In addition, artifacts generated due to instrumental noise at either side of a peak are not considered to be peaks.

The inventive polyethylene composition may further comprise additional components such as other polymers and/or additives. Such additives include, but are not limited to, antistatic agents, color enhancers, dyes, lubricants, fillers, pigments, primary antioxidants, secondary antioxidants, processing aids, UV stabilizers, and combinations thereof. The inventive polyethylene composition may contain any amounts of additives. The inventive polyethylene composition may comprise from about 0 to about 10 percent by the combined weight of such additives, based on the weight of the inventive polyethylene composition including such additives. All individual values and subranges from about 0 to about 10 weight percent are included herein and disclosed herein; for example, the inventive polyethylene composition may comprise from 0 to 7 percent by the combined weight of additives, based on the weight of the inventive polyethylene composition including such additives; in the alternative, the inventive polyethylene composition may comprise from 0 to 5 percent by the combined weight of additives, based on the weight of the inventive polyethylene composition including such additives; or in the alternative, the inventive polyethylene composition may comprise from 0 to 3 percent by the combined weight of additives, based on the weight of the inventive polyethylene composition including such additives; or in the alternative, the inventive polyethylene composition may comprise from 0 to 2 percent by the combined weight of additives, based on the weight of the inventive polyethylene composition including such additives; or in the alternative, the inventive polyethylene composition may comprise from 0 to 1 percent by the combined weight of additives, based on the weight of the inventive polyethylene composition including such additives; or in the alternative, the inventive polyethylene composition may comprise from 0 to 0.5 percent by the combined weight of additives, based on the weight of the inventive polyethylene composition including such additives. Antioxidants, such as Irgafos™ 168 and Irganox™ 1010, may be used to protect the inventive polyethylene composition from thermal and/or oxidative degradation. Irganox™ 1010 is tetrakis(methylene(3,5-di-tert-butyl-4hydroxyhydrocinnamate) available from Ciba Geigy Inc. Irgafos™ 168 is tris(2,4 di-tert-butylphenyl) phosphite available from Ciba Geigy Inc.

Any conventional ethylene (co)polymerization reaction may be employed to produce the inventive polyethylene composition. Such conventional ethylene (co)polymerization reactions include, but are not limited to, gas phase polymerization process, slurry phase polymerization process, liquid phase polymerization process, and combinations thereof using one or more conventional reactors, e.g. fluidized bed gas phase reactors, loop reactors, stirred tank reactors, batch reactors in parallel, series, and/or any combinations thereof. In the alternative, the inventive polyethylene composition may be produced in a high pressure reactor via a coordination catalyst system. For example, the inventive polyethylene composition according to the instant invention may be produced via gas phase polymerization process in a single gas phase reactor; however, the instant invention is not so limited, and any of the above polymerization processes may be employed. In one embodiment, the polymerization reactor may comprise of two or more reactors in series, parallel, or combinations thereof. Preferably, the polymerization reactor is one reactor, e.g. a fluidized bed gas phase reactor. In another embodiment, the gas phase polymerization reactor is a continuous polymerization reactor comprising one or more feed streams. In the polymerization reactor, the one or more feed streams are combined together, and the gas comprising ethylene and optionally one or more comonomers, e.g. one or more α-olefins, are flowed or cycled continuously through the polymerization reactor by any suitable means. The gas comprising ethylene and optionally one or more comonomers, e.g. one or more α-olefins, may be fed up through a distributor plate to fluidize the bed in a continuous fluidization process.

In production, a hafnium based metallocene catalyst system including a cocatalyst, as described hereinbelow in further details, ethylene, optionally one or more alpha-olefin comonomers, hydrogen, optionally one or more inert gases and/or liquids, e.g. $N_2$, isopentane, and hexane, and optionally one or more continuity additive, e.g. ethoxylated stearyl amine or aluminum distearate or combinations thereof, are continuously fed into a reactor, e.g. a fluidized bed gas phase reactor. The reactor may be in fluid communication with one or more discharge tanks, surge tanks, purge tanks, and/or recycle compressors. The temperature in the reactor is typically in the range of 70 to 115° C., preferably 75 to 110° C., more preferably 75 to 100° C., and the pressure is in the range of 15 to 30 atm, preferably 17 to 26 atm. A distributor plate at the bottom of the polymer bed provides a uniform flow of the upflowing monomer, comonomer, and inert gases stream. A mechanical agitator may also be provided to provide contact between the solid particles and the comonomer gas stream. The fluidized bed, a vertical cylindrical reactor, may have a bulb shape at the top to facilitate the reduction of gas velocity; thus, permitting the granular polymer to separate from the upflowing gases. The unreacted gases are then cooled to remove the heat of polymerization, recompressed, and then recycled to the bottom of the reactor. Once the residual hydrocarbons are removed, and the resin is transported under $N_2$ to a purge bin, moisture may be introduced to reduce the presence of any residual catalyzed reactions with $O_2$ before the inventive polyethylene composition is exposed to oxygen. The inventive polyethylene composition may then be transferred to an extruder to be pelletized. Such pelletization techniques are generally known. The inventive polyethylene composition may further be melt screened. Subsequent to the melting process in the extruder, the molten composition is passed through one or more active screens, positioned in series of more than one, with each active screen having a micron retention size of from about 2 μm to about 400 μm (2 to $4 \times 10^{-5}$ m), and preferably about 2 μm to about 300 μm (2 to $3 \times 10^{-5}$ m), and most preferably about 2 μm to about 70 μm (2 to $7 \times 10^{-6}$ m), at a mass flux of about 5 to 100 lb/hr/in² (1.0 to about 20 kg/s/m²). Such further melt screening is disclosed in U.S. Pat. No. 6,485,662, which is incorporated herein by reference to the extent that it discloses melt screening.

In an embodiment of a fluidized bed reactor, a monomer stream is passed to a polymerization section. The fluidized bed reactor may include a reaction zone in fluid communication with a velocity reduction zone. The reaction zone includes a bed of growing polymer particles, formed polymer particles and catalyst composition particles fluidized by the continuous flow of polymerizable and modifying gaseous components in the form of make-up feed and recycle fluid through the reaction zone. Preferably, the make-up feed includes polymerizable monomer, most preferably ethylene and optionally one or more α-olefin comonomers, and may also include condensing agents as is known in the art and disclosed in, for example, U.S. Pat. No. 4,543,399, U.S. Pat. No. 5,405,922, and U.S. Pat. No. 5,462,999.

The fluidized bed has the general appearance of a dense mass of individually moving particles, preferably polyethylene particles, as created by the percolation of gas through the bed. The pressure drop through the bed is equal to or slightly greater than the weight of the bed divided by the cross-sectional area. It is thus dependent on the geometry of the reactor. To maintain a viable fluidized bed in the reaction zone, the superficial gas velocity through the bed must exceed the minimum flow required for fluidization. Preferably, the superficial gas velocity is at least two times the minimum flow velocity. Ordinarily, the superficial gas velocity does not exceed 1.5 m/sec and usually no more than 0.76 ft/sec is sufficient.

In general, the height to diameter ratio of the reaction zone can vary in the range of about 2:1 to about 5:1. The range, of course, can vary to larger or smaller ratios and depends upon the desired production capacity. The cross-sectional area of the velocity reduction zone is typically within the range of about 2 to about 3 multiplied by the cross-sectional area of the reaction zone.

The velocity reduction zone has a larger inner diameter than the reaction zone, and can be conically tapered in shape. As the name suggests, the velocity reduction zone slows the velocity of the gas due to the increased cross sectional area. This reduction in gas velocity drops the entrained particles into the bed, reducing the quantity of entrained particles that flow from the reactor. The gas exiting the overhead of the reactor is the recycle gas stream.

The recycle stream is compressed in a compressor and then passed through a heat exchange zone where heat is removed before the stream is returned to the bed. The heat exchange zone is typically a heat exchanger, which can be of the horizontal or vertical type. If desired, several heat exchangers can be employed to lower the temperature of the cycle gas stream in stages. It is also possible to locate the compressor downstream from the heat exchanger or at an intermediate point between several heat exchangers. After cooling, the recycle stream is returned to the reactor through a recycle inlet line. The cooled recycle stream absorbs the heat of reaction generated by the polymerization reaction.

Preferably, the recycle stream is returned to the reactor and to the fluidized bed through a gas distributor plate. A gas deflector is preferably installed at the inlet to the reactor to prevent contained polymer particles from settling out and agglomerating into a solid mass and to prevent liquid accumulation at the bottom of the reactor as well to facilitate easy transitions between processes that contain liquid in the cycle gas stream and those that do not and vice versa. Such deflectors are described in the U.S. Pat. No. 4,933,149 and U.S. Pat. No. 6,627,713.

The hafnium based catalyst system used in the fluidized bed is preferably stored for service in a reservoir under a blanket of a gas, which is inert to the stored material, such as nitrogen or argon. The hafnium based catalyst system may be added to the reaction system, or reactor, at any point and by any suitable means, and is preferably added to the reaction system either directly into the fluidized bed or downstream of the last heat exchanger, i.e. the exchanger farthest downstream relative to the flow, in the recycle line, in which case the activator is fed into the bed or recycle line from a dispenser. The hafnium based catalyst system is injected into the bed at a point above distributor plate. Preferably, the hafnium based catalyst system is injected at a point in the bed where good mixing with polymer particles occurs. Injecting the hafnium based catalyst system at a point above the distribution plate facilitates the operation of a fluidized bed polymerization reactor.

The monomers can be introduced into the polymerization zone in various ways including, but not limited to, direct injection through a nozzle into the bed or cycle gas line. The monomers can also be sprayed onto the top of the bed through a nozzle positioned above the bed, which may aid in eliminating some carryover of fines by the cycle gas stream.

Make-up fluid may be fed to the bed through a separate line to the reactor. The composition of the make-up stream is determined by a gas analyzer. The gas analyzer determines the composition of the recycle stream, and the composition of the make-up stream is adjusted accordingly to maintain an essentially steady state gaseous composition within the reaction zone. The gas analyzer can be a conventional gas analyzer that determines the recycle stream composition to maintain the ratios of feed stream components. Such equipment is commercially available from a wide variety of sources. The gas analyzer is typically positioned to receive gas from a sampling point located between the velocity reduction zone and heat exchanger.

The production rate of inventive polyethylene composition may be conveniently controlled by adjusting the rate of catalyst composition injection, activator injection, or both. Since any change in the rate of catalyst composition injection will change the reaction rate and thus the rate at which heat is generated in the bed, the temperature of the recycle stream entering the reactor is adjusted to accommodate any change in the rate of heat generation. This ensures the maintenance of an essentially constant temperature in the bed. Complete instrumentation of both the fluidized bed and the recycle stream cooling system is, of course, useful to detect any temperature change in the bed so as to enable either the operator or a conventional automatic control system to make a suitable adjustment in the temperature of the recycle stream.

Under a given set of operating conditions, the fluidized bed is maintained at essentially a constant height by withdrawing a portion of the bed as product at the rate of formation of the particulate polymer product. Since the rate of heat generation is directly related to the rate of product formation, a measurement of the temperature rise of the fluid across the reactor, i.e. the difference between inlet fluid temperature and exit fluid temperature, is indicative of the rate of inventive polyethylene composition formation at a constant fluid velocity if no or negligible vaporizable liquid is present in the inlet fluid.

On discharge of particulate polymer product from reactor, it is desirable and preferable to separate fluid from the product and to return the fluid to the recycle line. There are numerous ways known to the art to accomplish this separation. Product discharge systems which may be alternatively employed are disclosed and claimed in U.S. Pat. No. 4,621,952. Such a system typically employs at least one (parallel) pair of tanks comprising a settling tank and a transfer tank arranged in series and having the separated gas phase returned from the top of the settling tank to a point in the reactor near the top of the fluidized bed.

In the fluidized bed gas phase reactor embodiment, the reactor temperature of the fluidized bed process herein ranges from 70° C. or 75° C., or 80° C. to 90° C. or 95° C. or 100° C. or 110° C. or 115° C., wherein a desirable temperature range comprises any upper temperature limit combined with any lower temperature limit described herein. In general, the reactor temperature is operated at the highest temperature that is feasible, taking into account the sintering temperature of the inventive polyethylene composition within the reactor and fouling that may occur in the reactor or recycle line(s).

The process of the present invention is suitable for the production of homopolymers comprising ethylene derived units, or copolymers comprising ethylene derived units and at least one or more other α-olefin(s) derived units.

In order to maintain an adequate catalyst productivity in the present invention, it is preferable that the ethylene is present in the reactor at a partial pressure at or greater than 160 psia (1100 kPa), or 190 psia (1300 kPa), or 200 psia (1380 kPa), or 210 psia (1450 kPa), or 220 psia (1515 kPa).

The comonomer, e.g. one or more α-olefin comonomers, if present in the polymerization reactor, is present at any level that will achieve the desired weight percent incorporation of the comonomer into the finished polyethylene. This is expressed as a mole ratio of comonomer to ethylene as described herein, which is the ratio of the gas concentration of comonomer moles in the cycle gas to the gas concentration of ethylene moles in the cycle gas. In one embodiment of the inventive polyethylene composition production, the comonomer is present with ethylene in the cycle gas in a mole ratio range of from 0 to 0.1 (comonomer:ethylene); and from 0 to 0.05 in another embodiment; and from 0 to 0.04 in another embodiment; and from 0 to 0.03 in another embodiment; and from 0 to 0.02 in another embodiment.

Hydrogen gas may also be added to the polymerization reactor(s) to control the final properties (e.g., $I_{21}$ and/or $I_2$) of the inventive polyethylene composition. In one embodiment, the ratio of hydrogen to total ethylene monomer (ppm $H_2$/ mol % $C_2$) in the circulating gas stream is in a range of from 0 to 60:1 in one embodiment; from 0.10:1 (0.10) to 50:1 (50) in another embodiment; from 0 to 35:1 (35) in another embodiment; from 0 to 25:1 (25) in another embodiment; from 7:1 (7) to 22:1 (22).

In one embodiment, the process for producing a polyethylene composition according to the instant invention comprises the steps of: (1) (co)polymerizing ethylene and optionally one or more α-olefin comonomer in the presence of a hafnium based metallocene catalyst via a gas phase (co)polymerization process in a single stage reactor; and (2) thereby producing the inventive polyethylene composition, wherein the polyethylene composition has a density in the range of 0.907 to 0.975 g/cm³, a molecular weight distribution ($M_w/M_n$) in the range of 1.70 to 3.62, a melt index ($I_2$) in the range of 2 to 1000 g/10 minutes, a molecular weight distribution ($M_z/M_w$) in the range of less than 2.5, and a vinyl unsaturation of less than 0.06 vinyls per one thousand carbon atoms present in the backbone of the composition.

In one embodiment, the process for producing a polyethylene composition according to the instant invention comprises the steps of: (1) (co)polymerizing ethylene and optionally one or more α-olefin comonomer in the presence of a hafnium based metallocene catalyst via a gas phase (co)polymerization process in a single stage reactor; and (2) thereby producing the inventive polyethylene composition, wherein the polyethylene composition has a density in the range of 0.950 to 0.954 g/cm³, a molecular weight distribution ($M_w/M_n$) in the range of 2.9 to 3.5, a melt index ($I_2$) in the range of 34 to 46 g/10 minutes, a molecular weight distribution ($M_z/M_w$) in the range of less than 2.2, and a vinyl unsaturation of less than 0.01 vinyls per one thousand carbon atoms present in the backbone of the composition.

In one embodiment, the process for producing a polyethylene composition according to the instant invention comprises the steps of: (1) (co)polymerizing ethylene and optionally one or more α-olefin comonomer in the presence of a hafnium based metallocene catalyst via a gas phase (co)polymerization process in a single stage reactor; and (2) thereby producing the inventive polyethylene composition, wherein the polyethylene composition has a density in the range of 0.950 to 0.954 g/cm³, a molecular weight distribution ($M_w/M_n$) in the range of 2.7 to 3.3, a melt index ($I_2$) in the range of 68 to 92 g/10 minutes, a molecular weight distribution ($M_z/M_w$) in the range of less than 2.2, and a vinyl unsaturation of less than 0.01 vinyls per one thousand carbon atoms present in the backbone of the composition.

The hafnium based catalyst system, as used herein, refers to a catalyst capable of catalyzing the polymerization of ethylene monomers and optionally one or more α-olefin co monomers to produce polyethylene. Furthermore, the hafnium based catalyst system comprises a hafnocene component. The hafnocene component may comprise mono-, bis- or tris-cyclopentadienyl-type complexes of hafnium. In one embodiment, the cyclopentadienyl-type ligand comprises cyclopentadienyl or ligands isolobal to cyclopentadienyl and substituted versions thereof. Representative examples of ligands isolobal to cyclopentadienyl include, but are not limited to, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a] acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "$H_4Ind$") and substituted versions thereof. In one embodiment, the hafnocene component is an unbridged bis-cyclopentadienyl hafnocene and substituted versions thereof. In another embodiment, the hafnocene component excludes unsubstituted bridged and unbridged bis-cyclopentadienyl hafnocenes, and unsubstituted bridged and unbridged bis-indenyl hafnocenes. The term "unsubstituted," as used herein, means that there are only hydride groups bound to the rings and no other group. Preferably, the hafnocene useful in the present invention can be represented by the formula (where "Hf" is hafnium):

$$Cp_nHfX_p \qquad (1)$$

wherein n is 1 or 2, p is 1, 2 or 3, each Cp is independently a cyclopentadienyl ligand or a ligand isolobal to cyclopentadienyl or a substituted version thereof bound to the hafnium; and X is selected from the group consisting of hydride, halides, $C_1$ to $C_{10}$ alkyls and $C_2$ to $C_{12}$ alkenyls; and wherein when n is 2, each Cp may be bound to one another through a bridging group A selected from the group consisting of $C_1$ to $C_5$ alkylenes, oxygen, alkylamine, silyl-hydrocarbons, and siloxyl-hydrocarbons. An example of $C_1$ to $C_5$ alkylenes include ethylene (—$CH_2CH_2$—) bridge groups; an example of an alkylamine bridging group includes methylamide (—($CH_3$)N—); an example of a silyl-hydrocarbon bridging group includes dimethylsilyl (—($CH_3)_2Si$—); and an example of a siloxyl-hydrocarbon bridging group includes (—O—($CH_3)_2Si$—O—). In one particular embodiment, the hafnocene component is represented by formula (1), wherein n is 2 and p is 1 or 2.

As used herein, the term "substituted" means that the referenced group possesses at least one moiety in place of one or more hydrogens in any position, the moieties selected from such groups as halogen radicals such as F, Cl, Br, hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof. More preferably, the hafnocene component useful in the present invention can be represented by the formula:

$(CpR_5)_2HfX_2$ (2)

wherein each Cp is a cyclopentadienyl ligand and each is bound to the hafnium; each R is independently selected from hydrides and $C_1$ to $C_{10}$ alkyls, most preferably hydrides and $C_1$ to $C_5$ alkyls; and X is selected from the group consisting of hydride, halide, $C_1$ to $C_{10}$ alkyls and $C_2$ to $C_{12}$ alkenyls, and more preferably X is selected from the group consisting of halides, $C_2$ to $C_6$ alkylenes and $C_1$ to $C_6$ alkyls, and most preferably X is selected from the group consisting of chloride, fluoride, $C_1$ to $C_5$ alkyls and $C_2$ to $C_6$ alkylenes. In a most preferred embodiment, the hafnocene is represented by formula (2) above, wherein at least one R group is an alkyl as defined above, preferably a $C_1$ to $C_5$ alkyl, and the others are hydrides. In a most preferred embodiment, each Cp is independently substituted with from one two three groups selected from the group consisting of methyl, ethyl, propyl, butyl, and isomers thereof.

In one embodiment, the hafnocene based catalyst system is heterogeneous, i.e. the hafnocene based catalyst may further comprise a support material. The support material can be any material known in the art for supporting catalyst compositions; for example an inorganic oxide; or in the alternative, silica, alumina, silica-alumina, magnesium chloride, graphite, magnesia, titania, zirconia, and montmorillonite, any of which can be chemically/physically modified such as by fluoriding processes, calcining or other processes known in the art. In one embodiment the support material is a silica material having an average particle size as determined by Malvern analysis of from 1 to 60 mm; or in the alternative, 10 to 40 mm.

The hafnocene based catalyst system may further comprise an activator. Any suitable activator known to activate catalyst components towards olefin polymerization may be suitable. In one embodiment, the activator is an alumoxane; in the alternative methalumoxane such as described by J. B. P. Soares and A. E. Hamielec in 3(2) POLYMER REACTION ENGINEERING 131 200 (1995). The alumoxane may preferably be co-supported on the support material in a molar ratio of aluminum to hafnium (Al:Hf) ranging from 80:1 to 200:1, most preferably 90:1 to 140:1.

Such hafnium based catalyst systems are further described in details in the U.S. Pat. No. 6,242,545 and U.S. Pat. No. 7,078,467, incorporated herein by reference.

In application, the inventive polyethylene composition may be used to manufacture shaped articles. Such articles may include, but are not limited to, injection molded articles such as totes, trays, bins, containers, waste baskets, food storage containers, lids, pitchers, shoe boxes, assorted storage boxes, cloths storage containers, Christmas ornament storage containers, photo storage containers, containers for the storage of flour, sugar, cereal, ice-cream, crackers, and the like, yogurt cups, sour cream cup, and the likes; injection blow molded articles; co-extruded blow molded articles; injection stretch blow molded articles; and compression molded articles. Different methods may be employed to manufacture such articles. Suitable conversion techniques include, but are not limited to, injection molding, injection blow molding, co-extrusion blow molding, injection stretch blow molding, and compression molding. Such techniques are generally well known. Preferred conversion techniques include, but are not limited to, injection molding.

In the injection molding process, the inventive polyethylene composition is fed into an extruder via a hopper. The extruder conveys, heats, melts, and pressurizes the inventive polyethylene composition to a form a molten stream. The molten stream is forced out of the extruder under pressure through a nozzle into a relatively cool mold held closed thereby filling the mold. The melt cools and hardens until fully set-up. The mold then opens and the molded article, e.g. totes, dish pans, waist containers, bottle caps, is removed. The injection molded cap may include a skirt that axially extends from the periphery of a base, and may further include internal threads for securing the cap to a container.

In a blow molding process, e.g. a three step injection blow molding process, the inventive polyethylene composition is melted, and then, it is formed into a tube via injection molding. The ends of the tube are sealed, except for an area in which the blowing air can enter. The sealed tube is transported to a second station where the tube is inflated inside of a mold thereby taking the shape of the mold. In the third station, the molded article, e.g. bottle, is cooled, and then ejected from the mold. If necessary, the molded article is then trimmed.

In compression molding process, a two-piece mold provides a cavity having the shape of a desired molded article. The mold is capable of being heated or cooled. An appropriate amount of the inventive polyethylene composition, preferably in a molten form, is loaded into the lower half of the mold. The two parts of the mold are brought together under pressure. The inventive polyethylene composition, molten by heat, is thereby welded into a continuous mass having the shape of the cavity. The continuous mass is hardened via chilling, under pressure, in the mold, thereby forming a compression molded article, e.g. bottle cap. The compression molded cap may include a skirt that axially extends from the periphery of a base, and may further include internal threads for securing the cap to a container.

The injection molded articles according to the instant invention comprise a polyethylene composition comprising (1) less than or equal to 100 percent by weight of the units derived from ethylene; and (2) less than 15 percent by weight of units derived from one or more α-olefin comonomers; wherein the polyethylene composition has a density in the range of 0.907 to 0.975 g/cm³, a molecular weight distribution ($M_w/M_n$) in the range of 1.70 to 3.62, a melt index ($I_2$) in the range of 2 to 1000 g/10 minutes, a molecular weight distribution ($M_z/M_w$) in the range of less than 2.5, vinyl unsaturation of less than 0.06 vinyls per one thousand carbon atoms present in the backbone of said composition.

The process for making an injection molded article according to the instant invention comprises the steps of: (a) selecting a polyethylene composition comprising (1) less than or equal to 100 percent by weight of the units derived from ethylene; and (2) less than 15 percent by weight of units derived from one or more α-olefin comonomers; wherein the polyethylene composition has a density in the range of 0.907 to 0.975 g/cm³, a molecular weight distribution ($M_w/M_n$) in the range of 1.70 to 3.62, a melt index ($I_2$) in the range of 2 to 1000 g/10 minutes, a molecular weight distribution ($M_w/M_n$) in the range of less than 2.5, vinyl unsaturation of less than 0.06 vinyls per one thousand carbon atoms present in the backbone of the composition; (b) injection molding the polyethylene composition; and (c) thereby forming the injection molded article.

EXAMPLES

The following examples illustrate the present invention but are not intended to limit the scope of the invention. The examples of the instant invention demonstrate that the inventive polyethylene composition has a narrow molecular weight distribution, narrow composition distribution, and improved low and room temperature impact resistance while maintaining stiffness and processability properties.

Inventive Examples

Catalyst Component Preparation

The hafnocene component can be prepared by techniques known in the art. For example, $HfCl_4$ (1.00 equiv.) can be added to ether at $-30°$ C. to $-50°$ C. and stirred to give a white suspension. The suspension can then be re-cooled to $-30°$ C. to $-50°$ C., and then lithium propylcyclopentadienide (2.00 equiv.) added in portions. The reaction will turn light brown and become thick with suspended solid on adding the lithium propylcyclopentadienide. The reaction can then be allowed to warm slowly to room temperature and stirred 10 to 20 hours. The resultant brown mixture can then be filtered to give brown solid and a straw yellow solution. The solid can then be washed with ether as is known in the art, and the combined ether solutions concentrated to under vacuum to give a cold, white suspension. Off-white solid product is then isolated by filtration and dried under vacuum, with yields of from 70 to 95%.

Catalyst Composition Preparation

The catalyst compositions should be made at a Al/Hf mole ratio of from about 80:1 to 130:1 and the hafnium loading on the finished catalyst should be from about 0.6 to 0.8 wt % Hf using the following general procedure. Methylaluminoxane (MAO) in toluene should be added to a clean, dry vessel and stirred at from 50 to 80 rpm and at a temperature in the range of 60 to 100° F. Additional toluene can then be added while stirring. The hafnocene can then be dissolved in an amount of toluene and placed in the vessel with the MAO. The metallocene/MAO mixture can then be stirred at for from 30 min to 2 hours. Next, an appropriate amount of silica (average particle size of from 22 to 28 μm, dehydrated at 600° C.) can be added and stirred for another hour or more. The liquid can then be decanted and the catalyst composition dried at elevated temperature under flowing nitrogen while being stirred.

Polymerization Process

The ethylene/1-hexene copolymers were produced in accordance with the following general procedure. The catalyst composition comprised a silica supported bis(n-propyl-cyclopentadienyl)hafnium dichloride with methalumoxane, the Al:Hf ratio being from about 80:1 to 130:1. The catalyst composition was injected dry into a fluidized bed gas phase polymerization reactor. More particularly, polymerization was conducted in a 336.5-419.3 mm ID diameter gas-phase fluidized bed reactor operating at approximately 2068 to 2586 kPa total pressure. The reactor bed weight was approximately 41-91 kg. Fluidizing gas was passed through the bed at a velocity of approximately 0.49 to 0.762 m per second. The fluidizing gas exiting the bed entered a resin disengaging zone located at the upper portion of the reactor. The fluidizing gas then entered a recycle loop and passed through a cycle gas compressor and water-cooled heat exchanger. The shell side water temperature was adjusted to maintain the reaction temperature to the specified value. Ethylene, hydrogen, 1-hexene and nitrogen were fed to the cycle gas loop just upstream of the compressor at quantities sufficient to maintain the desired gas concentrations. Gas concentrations were measured by an on-line vapor fraction analyzer. Product (the inventive polyethylene particles) was withdrawn from the reactor in batch mode into a purging vessel before it was transferred into a product bin. Residual catalyst and activator in the resin was deactivated in the product drum with a wet nitrogen purge. The catalyst was fed to the reactor bed through a stainless steel injection tube at a rate sufficient to maintain the desired polymer production rate. There were 6 separate polymerization runs conducted using this general process, each with varying conditions as elucidated in the Table I. Tables II-IV summarize the properties of the inventive polyethylene compositions 1-6 that resulted from each run.

Comparative Examples

The following comparative examples were provided.

Comparative example 1 is a high-density polyethylene (ethylene/hexene copolymer) having a density of approximately 0.952 g/cm³, and a melt index ($I_2$) of approximately 6.75 provided by The Dow Chemical Company™ under the tradename of DMDA-8907 NT 7™. Comparative example 1 is a comparative example to the inventive example 1.

Comparative example 2 is a high-density polyethylene (ethylene/hexene copolymer) having a density of approximately 0.954 g/cm³, and a melt index ($I_2$) of approximately 20 provided by The Dow Chemical Company™ under the tradename of DMDA-8920 NT 7™. Comparative example 2 is a comparative example to the inventive example 2.

Comparative example 3a is a high-density polyethylene (ethylene/hexene copolymer) having a density of approximately 0.942 g/cm³, and a melt index ($I_2$) of approximately 50 provided by The Dow Chemical Company™ under the tradename of DMDA-8950 NT 7™. Comparative example 3a is a comparative example to the inventive example 3.

Comparative example 3b is a high-density polyethylene (ethylene/hexene copolymer) having a density of approximately 0.952 g/cm³, and a melt index ($I_2$) of approximately 66 provided by The Dow Chemical Company™ under the tradename of DMDA-8965 NT 7™. Comparative example 3b is another comparative example to the inventive example 3.

Comparative example 3c is a polyethylene (ethylene/octene copolymer) having a density of approximately 0.942 g/cm³, and a melt index ($I_2$) of approximately 60 from Nova Chemicals™ under the tradename of Surpass IFs542-R™. Comparative example 3c is another comparative example to the inventive example 3.

Comparative example 4a is a linear-low-density polyethylene (ethylene/butene copolymer) having a density of approximately 0.926 g/cm³, and a melt index ($I_2$) of approximately 50 provided by The Dow Chemical Company™ under the tradename of DNDB-7147 NT 7™. Comparative example 4a is a comparative example to the inventive example 4.

Comparative example 4b was a sample from Nova Chemicals™ under the tradename of Surpass IFs730R™. Comparative example 4b is another comparative example to the inventive example 4.

Comparative example 5 is a linear-low-density polyethylene (ethylene/hexene copolymer) having a density of approximately 0.929 g/cm³, and a melt index ($I_2$) of approximately 100 provided by The Dow Chemical Company™ under the tradename of DNDB-1077 NT 7™. Comparative example 5 is a comparative example to the inventive example 5.

Comparative example 6a is a linear-low-density polyethylene (ethylene/hexene copolymer) having a density of approximately 0.933 g/cm³, and a melt index ($I_2$) of approximately 155 provided by The Dow Chemical Company™ under the tradename of DNDB-1082 NT 7™. Comparative example 6a is a comparative example to the inventive example 6.

Comparative example 6b is a polyethylene (ethylene/octene copolymer) having a density of approximately 0.932 g/cm³, and a melt index ($I_2$) of approximately 150 from Nova Chemicals™ under the tradename of Surpass IFs932-R™. Comparative example 6b is another comparative example to the inventive example 6.

Tables V-VII summarize the properties of the comparative polyethylene compositions.

TEST METHODS

Test methods include the following:

Density (g/cm³) was measured according to ASTM-D 792-03, Method B, in isopropanol. Specimens were measured within 1 hour of molding after conditioning in the isopropanol bath at 23° C. for 8 min to achieve thermal equilibrium prior to measurement. The specimens were compression molded according to ASTM D-4703-00 Annex A with a 5 min initial heating period at about 190° C. and a 15° C./min cooling rate per Procedure C. The specimen was cooled to 45° C. in the press with continued cooling until "cool to the touch."

Melt index ($I_2$) was measured at 190° C. under a load of 2.16 kg according to ASTM D-1238-03.

Melt index ($I_5$) was measured at 190° C. under a load of 5.0 kg according to ASTM D-1238-03.

Melt index ($I_{10}$) was measured at 190° C. under a load of 10.0 kg according to ASTM D-1238-03.

Melt index ($I_{21}$) was measured at 190° C. under a load of 21.6 kg according to ASTM D-1238-03.

Weight average molecular weight ($M_w$) and number average molecular weight ($M_n$) were determined according to methods known in the art using triple detector GPC, as described herein below.

The molecular weight distributions of the ethylene polymers were determined by gel permeation chromatography (GPC). The chromatographic system consisted of a Waters (Millford, Mass.) 150° C. high temperature gel permeation chromatograph, equipped with a Precision Detectors (Amherst, Mass.) 2-angle laser light scattering detector Model 2040. The 15° angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories. The carousel compartment was operated at 140° C. and the column compartment was operated at 150° C. The columns used were four Shodex HT 806M 300 mm, 13 µm columns and one Shodex HT803M 150 mm, 12 µm column. The solvent used was 1,2,4 trichlorobenzene. The samples were prepared at a concentration of 0.1 grams of polymer in 50 milliliters of solvent. The chromatographic solvent and the sample preparation solvent contained 200 µg/g of butylated hydroxytoluene (BHT). Both solvent sources were nitrogen sparged. Polyethylene samples were stirred gently at 160° C. for 4 hours. The injection volume used was 200 microliters, and the flow rate was 0.67 milliliters/min. Calibration of the GPC column set was performed with 21 narrow molecular weight distribution polystyrene standards, with molecular weights ranging from 580 to 8,400,000 g/mol, which were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to, or greater than, 1,000,000 g/mol, and 0.05 grams in 50 milliliters of solvent for molecular weights less than 1,000,000 g/mol. The polystyrene standards were dissolved at 80° C. with gentle agitation for 30 minutes. The narrow standards mixtures were run first, and in order of decreasing highest molecular weight component, to minimize degradation. The polystyrene standard peak molecular weights were converted to polyethylene molecular weights using the following equation (as described in Williams and Ward, *J. Polym. Sci., Polym. Let.,* 6, 621 (1968)):

$M$polyethylene=$A \times (M$polystyrene$)^B$, where M is the molecular weight, A has a value of 0.41 and B is equal to 1.0. The Systematic Approach for the determination of multi-detector offsets was done in a manner consistent with that published by Balke, Mourey, et al. (Mourey and Balke, *Chromatography Polym.* Chpt 12, (1992) and Balke, Thitiratsakul, Lew, Cheung, Mourey, *Chromatography Polym.* Chpt 13, (1992)), optimizing dual detector log results from Dow broad polystyrene 1683 to the narrow standard column calibration results from the narrow standards calibration curve using in-house software. The molecular weight data for off-set determination was obtained in a manner consistent with that published by Zimm (Zimm, B. H., *J. Chem. Phys.,* 16, 1099 (1948)) and Kratochvil (Kratochvil, P., *Classical Light Scattering from Polymer Solutions,* Elsevier, Oxford, N.Y. (1987)). The overall injected concentration used for the determination of the molecular weight was obtained from the sample refractive index area and the refractive index detector calibration from a linear polyethylene homopolymer of 115,000 g/mol molecular weight, which was measured in reference to NIST polyethylene homopolymer standard 1475. The chromatographic concentrations were assumed low enough to eliminate addressing $2^{nd}$ Virial coefficient effects (concentration effects on molecular weight). Molecular weight calculations were performed using in-house software. The calculation of the number-average molecular weight, weight-average molecular weight, and z-average molecular weight were made according to the following equations, assuming that the refractometer signal is directly proportional to weight fraction. The baseline-subtracted refractometer signal can be directly substituted for weight fraction in the equations below. Note that the molecular weight can be from the conventional calibration curve or the absolute molecular weight from the light scattering to refractometer ratio. An improved estimation of z-average molecular weight, the baseline-subtracted light scattering signal can be substituted for the product of weight average molecular weight and weight fraction in equation (2) below:

(2)

$$\overline{Mn} = \frac{\sum_i Wf_i}{\sum_i \left(\frac{Wf_i}{M_i}\right)} \quad \text{a)}$$

$$\overline{Mw} = \frac{\sum_i (Wf_i * M_i)}{\sum_i Wf_i} \quad \text{b)}$$

$$\overline{Mz} = \frac{\sum_i (Wf_i * M_i^2)}{\sum_i (Wf_i * M_i)} \quad \text{c)}$$

Monomodal distribution was characterized according to the weight fraction of the highest temperature peak in temperature rising elution fractionation (typically abbreviated as "TREF") data as described, for example, in Wild et al., *Journal of Polymer Science, Poly. Phys. Ed.*, Vol. 20, p. 441 (1982), in U.S. Pat. No. 4,798,081 (Hazlitt et al.), or in U.S. Pat. No. 5,089,321 (Chum et al.), the disclosures of all of which are incorporated herein by reference. In analytical temperature rising elution fractionation analysis (as described in U.S. Pat. No. 4,798,081 and abbreviated herein as "ATREF"), the composition to be analyzed is dissolved in a suitable hot solvent (for example, 1,2,4 trichlorobenzene), and allowed to crystallized in a column containing an inert support (for example, stainless steel shot) by slowly reducing the temperature. The column was equipped with both an infra-red detector and a differential viscometer (DV) detector. An ATREF-DV chromatogram curve was then generated by eluting the crystallized polymer sample from the column by slowly increasing the temperature of the eluting solvent (1,2,4 trichlorobenzene). The ATREF-DV method is described in further detail in WO 99/14271, the disclosure of which is incorporated herein by reference.

Long Chain Branching was determined according to the methods known in the art, such as gel permeation chromatography coupled with low angle laser light scattering detector (GPC-LALLS) and gel permeation chromatography coupled with a differential viscometer detector (GPC-DV).

Short chain branch distribution breadth (SCBDB) was determined based in the data obtained via analytical temperature rising elution fractionation (ATREF) analysis, described hereinbelow in further details. First, a cumulative distribution of the elution curve was calculated beginning at 30° C. and continuing to and including 109° C. From the cumulative distribution, temperatures were selected at 5 weight percent ($T_5$) and 95 weight percent ($T_{95}$). These two temperatures were then used as the bounds for the SCBDB calculation. The SCBDB is then calculated from the following equation:

$$SCBDB = \sqrt{\frac{\sum_i w_i (T_i - T_w)^2}{\sum_i w_i}}$$

for all $T_i$ including and between $T_5$ and $T_{95}$. $T_i$ is the temperature at the ith point on the elution curve, $w_i$ is the weight fraction of material from each temperature on the elution curve, and $T_w$ is the weight-averaged temperature of the elution curve ($\Sigma(w_i T_i)/\Sigma w_i$) between and including $T_5$ and $T_{95}$.

Analytical temperature rising elution fractionation (ATREF) analysis was conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are incorporated by reference herein in their entirety. The composition to be analyzed was dissolved in trichlorobenzene and allowed to crystallize in a column containing an inert support (stainless steel shot) by slowly reducing the temperature to 20° C. at a cooling rate of 0.1° C./min. The column was equipped with an infrared detector. An ATREF chromatogram curve was then generated by eluting the crystallized polymer sample from the column by slowly increasing the temperature of the eluting solvent (trichlorobenzene) from 20 to 120° C. at a rate of 1.5° C./min.

Comonomer content was measured using $C_{13}$ NMR, as discussed in Randall, *Rev. Macromol. Chem. Chys.*, C29 (2&3), pp. 285-297, and in U.S. Pat. No. 5,292,845, the disclosures of which are incorporated herein by reference to the extent related to such measurement. The samples were prepared by adding approximately 3 g of a 50/50 mixture of tetrachloroethane-d2/orthodichlorobenzene that was 0.025M in chromium acetylacetonate (relaxation agent) to 0.4 g sample in a 10 mm NMR tube. The samples were dissolved and homogenized by heating the tube and its contents to 150° C. The data was collected using a JEOL Eclipse 400 MHz NMR spectrometer, corresponding to a 13C resonance frequency of 100.6 MHz. Acquisition parameters were selected to ensure quantitative 13C data acquisition in the presence of the relaxation agent. The data was acquired using gated 1H decoupling, 4000 transients per data file, a 4.7 sec relaxation delay and 1.3 second acquisition time, a spectral width of 24,200 Hz and a file size of 64K data points, with the probe head heated to 130° C. The spectra were referenced to the methylene peak at 30 ppm. The results were calculated according to ASTM method D5017-91.

Melt temperature and crystallization temperature were measured via Differential Scanning Calorimetry (DSC). All of the results reported here were generated via a TA Instruments Model Q1000 DSC equipped with an RCS (refrigerated cooling system) cooling accessory and an auto sampler. A nitrogen purge gas flow of 50 ml/min was used throughout. The sample was pressed into a thin film using a press at 175° C. and 1500 psi (10.3 MPa) maximum pressure for about 15 seconds, then air-cooled to room temperature at atmospheric pressure. About 3 to 10 mg of material was then cut into a 6 mm diameter disk using a paper hole punch, weighed to the nearest 0.001 mg, placed in a light aluminum pan (ca 50 mg) and then crimped shut. The thermal behavior of the sample was investigated with the following temperature profile: The sample was rapidly heated to 180° C. and held isothermal for 3 minutes in order to remove any previous thermal history. The sample was then cooled to −40° C. at 10° C./min cooling rate and was held at −40° C. for 3 minutes. The sample was then heated to 150° C. at 10° C./min heating rate. The cooling and second heating curves were recorded.

Vinyl unsaturations were measured according to ASTM D-6248-98.

Trans unsaturations were measured according to ASTM D-6248-98.

Methyl groups were determined according to ASTM D-2238-92.

Resin stiffness was characterized by measuring the Flexural Modulus at 5 percent strain and Secant Modulii at 1 percent and 2 percent strain, and a test speed of 0.5 inch/min (13 mm/min) according to ASTM D-790-99 Method B.

Tensile testing is determined via ASTM D-638 at 2 inches per minute strain rate.

Tensile impact was determined according to ASTM D-1822-06.

The capillary viscosity measured at 190° C. on a Goettfert Rheograph 2003 fitted with a flat entrance (180°) die of length 20 mm and diameter of 1 mm at apparent shear rates ranging from 100 to 6300 s$^{-1}$. Rabinowitsch correction was applied to account for the shear thinning effect. The corrected shear rate and shear viscosity were reported herein.

The present invention may be embodied in other forms without departing from the spirit and the essential attributes thereof, and, accordingly, reference should be made to the appended claims, rather than to the foregoing specification, as indicating the scope of the invention.

TABLE I

| Measurement | Units | Inventive 1 | Inventive 2 | Inventive 3 | Inventive 4 | Inventive 5 | Inventive 6 |
|---|---|---|---|---|---|---|---|
| Reactor Temperature | °C. | 95.0 | 95.0 | 85.0 | 85.0 | 85.0 | 85.0 |
| Isopentane % | mol % | 4.8 | 5.3 | 5.2 | 5.3 | 5.6 | 5.0 |
| Ethylene Partial Pressure | psia | 225.1 | 225.2 | 225.0 | 150.0 | 150.0 | 150.3 |
| C6/C2 molar ratio | unitless | 0.0016 | 0.0026 | 0.0042 | 0.0110 | 0.0115 | 0.0115 |
| Hydrogen Vapor Concentration | ppm | 320 | 500 | 550 | 703 | 720 | 777 |
| Continuity Additive amount in resin | ppm(w) | 6 | 3 | 6 | 8 | 8 | 8 |
| Hf amount in resin | ppm(w) | 0.87 | 0.88 | 0.57 | 2.18 | 0.93 | 0.83 |
| Al amount in resin | ppm(w) | 11.3 | 12.5 | 9.8 | 62.2 | 26.5 | 34.3 |

TABLE II

| Measurement | Units | Inventive 1 | Inventive 2 | Inventive 3 | Inventive 4 | Inventive 5 | Inventive 6 |
|---|---|---|---|---|---|---|---|
| Density | g/cm$^3$ | 0.954 | 0.9542 | 0.9523 | 0.9314 | 0.9334 | 0.9335 |
| $I_2$ | g/10 min | 10.4 | 36.9 | 74.6 | 77.03 | 136.7 | 177.3 |
| $I_5$ | g/10 min | 27.2 | 88.8 | 220.5 | 203.3 | 416.2 | 483.6 |
| $I_{10}$ | g/10 min | 65.8 | 260 | — | — | — | — |
| $I_{21}$ | g/10 min | 201.3 | 785 | — | — | — | — |
| $I_{10}/I_2$ | — | 6.3 | 7.1 | — | — | — | — |
| $I_{21}/I_2$ | — | 19.3 | 21.3 | — | — | — | — |
| Conventional GPC | | | | | | | |
| Mn | g/mol | 19600 | 13700 | 11970 | 9900 | 7640 | 7460 |
| Mw | g/mol | 62670 | 43990 | 36330 | 32540 | 27660 | 25610 |
| Mz | g/mol | 127700 | 89120 | 71630 | 69700 | 61100 | 56800 |
| Mw/Mn | unitless | 3.20 | 3.21 | 3.04 | 3.29 | 3.62 | 3.43 |
| Mz/Mw | unitless | 2.04 | 2.03 | 1.97 | 2.14 | 2.21 | 2.22 |
| Absolute GPC | | | | | | | |
| Mn absolute | g/mol | 18204.00 | 11687 | 10213 | 10869 | 8249 | 8408 |
| Mw absolute | g/mol | 62770.00 | 40940 | 34660 | 33330 | 28110 | 25740 |
| Mz(BB) | g/mol | 131000.00 | 91300 | 78500 | 63700 | 64800 | 59000 |
| Mz(BB)/Mw(abs) | unitless | 2.09 | 2.23 | 2.26 | 1.91 | 2.31 | 2.29 |
| Shear Viscosity at ~3000 s$^{-1}$ | Pa-s | 132.4 | 73.2 | 51.4 | 49.7 | 32.5 | 26.6 |
| methyls | per 1000 C's | 0.87 | 1.910 | 2.880 | 9.62 | 10.4 | 11.000 |
| trans | per 1000 C's | 0.033 | 0.019 | 0.015 | 0.004 | 0.010 | 0.009 |
| vinyls | per 1000 C's | 0.002 | 0.003 | 0.000 | 0.006 | 0.004 | 0.004 |

TABLE III

| Measurement | Units | Inventive 1 | Inventive 2 | Inventive 3 | Inventive 4 | Inventive 5 | Inventive 6 |
|---|---|---|---|---|---|---|---|
| T (crystallization) DSC | °C. | 116.7 | 116.8 | 116.2 | 109.0 | 109.9 | 110.2 |
| T (melt) DSC | °C. | 130.4 | 128.6 | 127.7 | 119.2 | 120.0 | 119.8 |
| Heat of Fusion (DSC) | J/g | 192.2 | 191.3 | 188.0 | 166.6 | 171.7 | 173.3 |
| ATREF Data | | | | | | | |
| HD Fraction | % | 86.5 | 89.0 | 79.8 | 2.1 | 1.3 | 1.3 |
| Temperature Min. | °C. | 86.4 | 86.2 | 86.0 | 95.8 | 96.0 | 96.0 |
| Percent Solubles | % | 8.5 | 4.3 | 7.3 | 2.7 | 13.5 | 15.4 |
| Average Mv | g/mol | 64510 | 32099 | 28435 | 29908 | 25348 | 18597 |
| SCBD Breadth | °C. | 2.93 | 3.2 | 4.86 | 5.55 | 6.67 | 7.7 |

TABLE IV

| Measurement | Units | Inventive 1 | Inventive 2 | Inventive 3 | Inventive 4 | Inventive 5 | Inventive 6 |
|---|---|---|---|---|---|---|---|
| Tensile Plaque Thickness | inches | 0.0666 | 0.0628 | 0.066 | 0.0626 | 0.0644 | 0.0647 |
| Tensile Toughness | inch-lb | 296.00 | 19.00 | 3.00 | 35.96 | 18.22 | 13.13 |
| Tensile Strain at Break | % | 791.22 | 44.35 | 6.75 | 162.38 | 71.78 | 43.73 |
| Tensile Stress at Break | psi | 2949 | 3109 | 3786 | 1425 | 1412 | 1584 |
| Yield Strain | % | 100.158 | 2.576 | 2.052 | 4.24 | 4.202 | 3.1575 |
| Yield Stress | psi | 3499 | 2719 | 2388 | 1345 | 1593 | 1547 |
| Tensile Impact | ft-lbs/in$^2$ | — | — | 12.1 | 44.9 | 36.3 | 23 |
| Flexural Modulus | psi | 176115 | 220474 | 195374 | 108993 | 116423 | 118894 |
| 1% Secant Modulus | psi | 143381 | 182678 | 165717 | 81882 | 87946 | 88596 |
| 2% Secant Modulus | psi | 120762 | 152970 | 141023 | 95824 | 102659 | 103300 |

TABLE V

| Measurement | Units | Comparative 1 | Comparative 2 | Comparative 3a | Comparative 3b | Comparative 3c |
|---|---|---|---|---|---|---|
| Density | g/cm$^3$ | 0.951 | 0.9565 | 0.944 | 0.9541 | 0.9431 |
| $I_2$ | g/10 min | 6.6 | 18.2 | 43.2 | 56.0 | 55.8 |
| $I_5$ | g/10 min | 17.5 | 53.0 | 128.9 | 157.7 | 145.5 |
| $I_{10}$ | g/10 min | 47.1 | 138.6 | — | — | — |
| $I_{21}$ | g/10 min | 178.0 | 539.4 | — | — | — |
| $I_{10}/I_2$ | | 7.1 | 7.6 | — | — | — |
| $I_{21}/I_2$ | | 26.8 | 29.7 | — | — | — |
| Conventional GPC | | | | | | |
| Mn | g/mol | 19750 | 13960 | 10790 | 10690 | 10350 |
| Mw | g/mol | 73460 | 55210 | 44670 | 41880 | 37570 |
| Mz | g/mol | 199800 | 154100 | 140600 | 127600 | 80750 |
| Mw/Mn | unitless | 3.72 | 3.95 | 4.14 | 3.92 | 3.63 |
| Mz/Mw | unitless | 2.72 | 2.79 | 3.15 | 3.05 | 2.15 |
| Absolute GPC | | | | | | |
| Mn absolute | g/mol | 17576 | 12348 | 9812 | 9122 | 12192 |
| Mw absolute | g/mol | 127230 | 91130 | 65860 | 71170 | 38560 |
| Mz(BB) | g/mol | 765200 | 643300 | 550700 | 712300 | 89300 |
| Mz(BB)/Mw(abs) | unitless | 6.01 | 7.06 | 8.36 | 10.01 | 2.32 |
| Shear Viscosity at ~3000 s$^{-1}$ | Pa-s | 129.2 | 85.1 | 56.0 | 50.7 | 51.6 |
| methyls | per 1000 C's | 1.32 | 1.840 | 5.830 | 3.220 | 4.060 |
| trans | per 1000 C's | 0.001 | 0.002 | 0.002 | 0.002 | 0.128 |
| vinyls | per 1000 C's | 0.110 | 0.098 | 0.082 | 0.096 | 0.096 |

| Measurement | Units | Comparative 4a | Comparative 4b | Comparative 5 | Comparative 6a | Comparative 6b |
|---|---|---|---|---|---|---|
| Density | g/cm$^3$ | 0.9269 | 0.9303 | 0.9306 | 0.9343 | 0.9332 |
| $I_2$ | g/10 min | 45.1 | 80.5 | 74.3 | 123.1 | 143.5 |
| $I_5$ | g/10 min | 134.2 | 212.2 | 218.6 | 435.0 | 471.6 |
| $I_{10}$ | g/10 min | — | — | — | — | — |
| $I_{21}$ | g/10 min | — | — | — | — | — |
| $I_{10}/I_2$ | | — | — | — | — | — |
| $I_{21}/I_2$ | | — | — | — | — | — |
| Conventional GPC | | | | | | |
| Mn | g/mol | 8580 | 9180 | 6950 | 6710 | 7890 |
| Mw | g/mol | 38960 | 32030 | 34560 | 29800 | 27860 |
| Mz | g/mol | 120100 | 81800 | 129000 | 97100 | 74400 |
| Mw/Mn | unitless | 4.54 | 3.49 | 4.97 | 4.44 | 3.53 |
| Mz/Mw | unitless | 3.08 | 2.55 | 3.73 | 3.26 | 2.67 |
| Absolute GPC | | | | | | |
| Mn absolute | g/mol | 9342 | 9881 | 7047 | 7212 | 8700 |
| Mw absolute | g/mol | 52170 | 32110 | 43170 | 37700 | 29470 |
| Mz(BB) | g/mol | 368200 | 79100 | 302400 | 196400 | 70900 |
| Mz(BB)/Mw(abs) | unitless | 7.06 | 2.46 | 7.00 | 5.21 | 2.41 |
| Shear Viscosity at ~3000 s$^{-1}$ | Pa-s | 54.2 | 39.1 | 36.5 | 28.8 | 27.3 |
| methyls | per 1000 C's | 17.60 | 9.62 | 13.9 | 13.300 | 9.640 |
| trans | per 1000 C's | 0.057 | 0.258 | 0.008 | 0.007 | 0.338 |
| vinyls | per 1000 C's | 0.088 | 0.099 | 0.075 | 0.071 | 0.083 |

TABLE VI

| Measurement | Units | Comparative 1 | Comparative 2 | Comparative 3a | Comparative 3b | Comparative 3c |
|---|---|---|---|---|---|---|
| T (crystallization) DSC | ° C. | 117.1 | 116.5 | 114.1 | 115.4 | 113.5 |
| T (melt) DSC | ° C. | 130.7 | 130.0 | 126.6 | 128.9 | 125.1 |
| Melting Energy (DSC) | J/g | 190.5 | 194.9 | 174.4 | 190.1 | 170.8 |
| ATREF Data | | | | | | |
| HD Fraction | % | 81.3 | 80.6 | 60.7 | 73.2 | 59.4 |
| Temperature Min. | ° C. | 86.0 | 86.1 | 86.0 | 86.1 | 87.3 |
| Percent Solubles | % | 11.9 | 11.4 | 7.7 | 9.7 | 10.3 |
| Average Mv | g/mol | 59095 | 40234 | 27454 | 36059 | 38683 |
| SCBD Breadth | ° C. | 4.22 | 4.47 | 5.32 | 6.63 | 4.93 |

| Measurement | Units | Comparative 4a | Comparative 4b | Comparative 5 | Comparative 6a | Comparative 6b |
|---|---|---|---|---|---|---|
| T (crystallization) DSC | ° C. | 107.9 | 107.6 | 113.0 | 112.3 | 108.8 |
| T (melt) DSC | ° C. | 120.4 | 117.3 | 124.4 | 124.3 | 118.4 |
| Melting Energy (DSC) | J/g | 156.1 | 163.2 | 164.4 | 172.2 | 168.7 |

TABLE VI-continued

| ATREF Data | | | | | | |
|---|---|---|---|---|---|---|
| HD Fraction | % | 14.0 | 1.0 | 37.5 | 33.5 | 0.6 |
| Temperature Min. | ° C. | 93.4 | 96.0 | 86.4 | 87.5 | 96.0 |
| Percent Solubles | % | 18.3 | 11.1 | 21.6 | 16.9 | 16.1 |
| Average Mv | g/mol | 24340 | 25990 | 23970 | 15361 | 19106 |
| SCBD Breadth | ° C. | 12.52 | 7.05 | 11.88 | 13.12 | 8.32 |

TABLE VII

| Measurement | Units | Comparative 1 | Comparative 2 | Comparative 3a | Comparative 3b | Comparative 3c |
|---|---|---|---|---|---|---|
| Tensile Plaque Thickness | inches | — | — | 0.062 | 0.062 | 0.0682 |
| Tensile Toughness | inch-lb | — | — | 6.33 | 2.94 | 14.96 |
| Tensile Strain at Break | % | 1050.70 | 266.56 | 14.22 | 6.24 | 37.70 |
| Tensile Stress at Break | psi | 3355 | 2013 | 3179 | 3855 | 2548 |
| Yield Strain | % | 4.232 | 3.982 | 2.772 | 1.368 | 3.052 |
| Yield Stress | psi | 3641 | 3776 | 2505 | 2382 | 1923 |
| Tensile Impact | ft-lbs/in$^2$ | — | — | 16.3 | 3.36 | 33.4 |
| Flexural Modulus | psi | 212581 | 225307 | 163429 | 198625 | 161826 |
| 1% Secant Modulus | psi | 167433 | 182542 | 130873 | 180714 | 133861 |
| 2% Secant Modulus | psi | 139287 | 152835 | 106919 | 155019 | 114550 |

| Measurement | Units | Comparative 4a | Comparative 4b | Comparative 5 | Comparative 6a | Comparative 6b |
|---|---|---|---|---|---|---|
| Tensile Plaque Thickness | inches | 0.066 | 0.0666 | 0.0654 | 0.0634 | 0.0648 |
| Tensile Toughness | inch-lb | 36.85 | 15.80 | 30.49 | 10.74 | 4.96 |
| Tensile Strain at Break | % | 134.50 | 67.56 | 136.32 | 22.88 | 15.64 |
| Tensile Stress at Break | psi | 1094 | 785 | 1154 | 2240 | 2290 |
| Yield Strain | % | 4.082 | 3.962 | 3.064 | 3.346 | 3.12 |
| Yield Strength | psi | 1102 | 1067 | 1559 | 1750 | 1466 |
| Tensile Impact | ft-lbs/in$^2$ | 27.6 | 30.2 | 29.7 | 15.1 | 9.69 |
| Flexural Modulus | psi | 92861 | 89836 | 106521 | 126395 | 99611 |
| 1% Secant Modulus | psi | 69924 | 68203 | 79416 | 93241 | 75375 |
| 2% Secant Modulus | psi | 81345 | 78959 | 92929 | 109648 | 87382 |

We claim:

1. A polyethylene composition comprising:
   less than or equal to 100 percent by weight of the units derived from ethylene;
   less than 15 percent by weight of units derived from one or more α-olefin comonomers;
   wherein said polyethylene composition has a density of equal to D g/cm$^3$, wherein D=[(0.0034(Ln(I$_2$))+ 0.9553], wherein I$_2$ is melt index expressed in g/10 min, a molecular weight distribution (M$_w$/M$_n$) in the range of 1.70 to 3.62, a melt index (I$_2$) in the range of 2 to 1000 g/10 minutes, a molecular weight distribution (M$_z$/M$_w$) in the range of less than 2.5, vinyl unsaturation of less than 0.06 vinyls per one thousand carbon atoms present in the backbone of said composition.

2. The polyethylene composition according to claim 1, wherein said polyethylene composition has a molecular weight distribution (M$_w$/M$_n$) of less than [(−16.18))(D)]+ 18.83.

3. The polyethylene composition according to claim 1, wherein said polyethylene composition has a short chain branching distribution breadth (SCBDB) expressed in ° C. of less than or equal to [0.025 (I$_2$)+4.08], wherein I$_2$ is melt index expressed in g/10 min.

4. The polyethylene composition according to claim 1, wherein said polyethylene composition has a short chain branching distribution breadth (SCBDB) expressed in ° C. of less than or equal to [0.0312 (I$_2$)+2.87], wherein I$_2$ is melt index expressed in g/10 min.

5. The polyethylene composition according to claim 1, wherein said polyethylene composition has a tensile impact expressed in ft-lb/in$^2$ of equal or greater than [(−6.53*10$^{-5}$) (x$^4$)]+[(1.3*10$^{-2}$)(x$^3$)]−[(9.68*10$^{-1}$)(x$^2$)]+[(3.22*10)(x)]− [(3.69*10$^2$)], wherein x is the shear viscosity of said composition expressed in Pascal-s at 3000s$^{-1}$ shear rate measured at 190° C., and wherein the shear viscosity is in the range of 25 to 55 Pascal-s at 3000 s$^{-1}$ shear rate measured at 190° C.

6. The polyethylene composition according to claim 1, wherein said polyethylene composition has a a melt index (I$_2$) in the range of 40 to 80 g/10 minutes.

7. The polyethylene composition according to claim 1, wherein said polyethylene composition has a melt index (I$_2$) in the range of 80 to 250 g/10 minutes.

8. The polyethylene composition according to claim 1, wherein said polyethylene composition has a melt index (I$_2$) in the range of 100 to 300 g/10 minutes.

9. The polyethylene composition according to claim 1, wherein said polyethylene composition has a melt index (I$_2$) in the range of 60 to 110 g/10 minutes.

10. The polyethylene composition according to claim 1, wherein said polyethylene composition has a melt index (I$_2$) in the range of 30 to 90 g/10 minutes.

11. The polyethylene composition according to claim 1, wherein said polyethylene composition has a melt index (I$_2$) in the range of 3 to 30 g/10 minutes.

12. The polyethylene composition according to claim 1, wherein said polyethylene composition has less than 2 peaks on an elution temperature-eluted amount curve determined by continuous temperature rising elution fraction method at equal or above 30° C., wherein the purge peak which is below 30° C. is excluded.

13. The polyethylene composition according to claim 1, wherein said polyethylene composition comprises less than 11 percent by weight of the units derived from one or more α-olefin comonomers.

14. The polyethylene composition according to claim 1, wherein said polyethylene composition is substantially free of long chain branching.

15. The polyethylene composition according to claim 1, wherein said polyethylene composition comprises less than 100 parts by weight of a hafnium based metallocene catalyst per one million parts of polyethylene composition.

16. The polyethylene composition according to claim 1, wherein said polyethylene composition has a melt flow ratio ($I_{21}/I_2$) in the range of 17-24.

17. The polyethylene composition according to claim 1, wherein said polyethylene composition has a melt index $I_{21}$ in the range of 34 to 23500 g/10 minutes.

* * * * *